(12) United States Patent
Ikenori

(10) Patent No.: US 11,884,305 B2
(45) Date of Patent: Jan. 30, 2024

(54) WORK VEHICLE

(71) Applicant: Yanmar Power Technology Co., Ltd., Osaka (JP)

(72) Inventor: Kenta Ikenori, Osaka (JP)

(73) Assignee: Yanmar Power Technology Co., Ltd., Osaka (JP)

(*) Notice: Subject to any disclaimer, the term of this patent is extended or adjusted under 35 U.S.C. 154(b) by 673 days.

(21) Appl. No.: 17/057,560

(22) PCT Filed: Apr. 11, 2019

(86) PCT No.: PCT/JP2019/015799
§ 371 (c)(1),
(2) Date: Nov. 20, 2020

(87) PCT Pub. No.: WO2019/225197
PCT Pub. Date: Nov. 28, 2019

(65) Prior Publication Data
US 2021/0197866 A1    Jul. 1, 2021

(30) Foreign Application Priority Data

May 22, 2018 (JP) .................................. 2018-098272

(51) Int. Cl.
*B60W 60/00* (2020.01)
*B60Q 9/00* (2006.01)
(Continued)

(52) U.S. Cl.
CPC .......... *B60W 60/0051* (2020.02); *B60Q 9/00* (2013.01); *B60T 7/042* (2013.01); *B60T 7/06* (2013.01);
(Continued)

(58) Field of Classification Search
CPC ....... B60W 60/0051; B60W 2050/022; B60W 2300/152; B60W 50/0205; B60W 50/029;
(Continued)

(56) References Cited

U.S. PATENT DOCUMENTS

2001/0056544 A1* 12/2001 Walker ............... B60W 50/029
180/170
2004/0002808 A1* 1/2004 Hashimoto .......... F02D 11/107
701/107
(Continued)

*Primary Examiner* — Russell Frejd
(74) *Attorney, Agent, or Firm* — Chris Mizumoto

(57) ABSTRACT

The present invention makes it possible to avoid the risk of a brake operation system for emergency stopping not operating normally during autonomous travel of a work vehicle. A work vehicle is provided with: a foot brake for braking left and right rear wheels; an autonomous travel unit that enables autonomous travel of the vehicle; and an electric actuator for switching the foot brake between a braking state and a release state. The autonomous travel unit comprises a control unit for controlling the operation of the electric actuator. When an autonomous travel mode is selected by human operation of a mode selection unit, the control unit performs operation verification processing in which it is verified by operation control of the electric actuator whether the foot brake is operating normally, and when it is verified that the foot brake is operating normally in the operation verification processing, said control unit transitions to a completed operation verification state and allows the travel mode to transition from a manual travel mode to the autonomous travel mode.

5 Claims, 20 Drawing Sheets

(51) Int. Cl.
*B60T 7/04* (2006.01)
*B60T 7/06* (2006.01)
*B60T 7/12* (2006.01)
*B60T 13/74* (2006.01)
*B60T 17/22* (2006.01)
*G05D 1/00* (2006.01)
*A01B 69/04* (2006.01)
*B60T 11/04* (2006.01)

(52) U.S. Cl.
CPC .............. *B60T 7/12* (2013.01); *B60T 13/741* (2013.01); *B60T 17/221* (2013.01); *G05D 1/0061* (2013.01); *A01B 69/008* (2013.01); *B60T 11/04* (2013.01); *B60T 2220/04* (2013.01); *B60T 2270/406* (2013.01); *G05D 2201/0201* (2013.01)

(58) Field of Classification Search
CPC ....... B60W 2540/12; B60W 2540/215; B60W 10/18; B60Q 9/00; B60Q 2800/20; B60T 7/042; B60T 7/06; B60T 7/12; B60T 13/741; B60T 17/221; B60T 11/04; B60T 2220/04; B60T 2270/406; G05D 1/0061; G05D 2201/0201; G05D 2201/0213; A01B 69/008; A01B 69/00; G05G 1/01; G05G 1/44; G05G 11/00

See application file for complete search history.

(56) References Cited

U.S. PATENT DOCUMENTS

2012/0303233 A1\* 11/2012 Kato .................... B60T 7/12
  701/70
2021/0362718 A1\* 11/2021 Ikenori ................ B60W 10/04

\* cited by examiner

WORK VEHICLE

CROSS-REFERENCE

This application is a US National Stage Application under 35 U.S.C. § 371 of International Application No. PCT/JP2019/015799 filed Apr. 11, 2019, which claims foreign priority of JP2018-098272 filed May 22, 2018, the disclosures of which are hereby incorporated by reference in their entirety.

TECHNICAL FIELD

The present invention relates to a work vehicle including a foot brake for braking a driving device.

BACKGROUND ART

Some passenger cars, use a driving support device and a driving support method in which emergency brake control is performed when there is a risk of collision with a preceding vehicle (for example, refer to PTL 1).

CITATION LIST

Patent Literature

PTL 1: Japanese Unexamined Patent Publication No. 2017-43193

DISCLOSURE OF INVENTION

Problems to Be Solved By the Invention

In recent years, work vehicles, such as tractors, have been automated to enable autonomous driving of work vehicles through the use of satellite positioning systems (navigation satellite systems (NSS)), such as a global positioning system (GPS). Advancement in such automation of work vehicles leads to the realization of unmanned work vehicles that are capable of autonomous driving of the unmanned work vehicles. In order to realize such an unmanned work vehicle that is capable of autonomous driving, the work vehicle needs to have an emergency brake operation system for quickly stopping the work vehicle.

A work vehicle that is capable of autonomous driving in an unmanned state is originally configured to be driven by a passenger. Therefore, in some cases, the work vehicle may not autonomously drive for a long period of time. In such a case, if the work vehicle autonomously drives, the brake operation system for emergency stop may not operate normally.

In view of such a situation, a main object of the present invention is to avoid the possibility that the brake operation system for emergency stop not operating normally during autonomous drive of the work vehicle.

Means for Solving the Problems

A first characteristic configuration of the present invention is in a work vehicle including:
  a foot brake that brakes a driving device;
  an autonomous drive unit that enables autonomous drive of a vehicle;
  a mode selector that enables selection of an autonomous drive mode in which the autonomous drive unit autonomously drives the vehicle; and
  an electric actuator that switches the foot brake between a braking state for braking the driving device and a released state for releasing the braking, wherein,
  the autonomous drive unit includes a control unit that controls an operation of the electric actuator, and
  when the autonomous drive mode is selected by a manual operation of the mode selector, the control unit performs an operation confirmation process for confirming whether or not the foot brake operates normally under operation control of the electric actuator, and when a normal operation of the foot brake is confirmed in the operation confirmation process, the work vehicle transitions to an operation confirmed state and permits a transition of a drive mode from a manual drive mode to the autonomous drive mode.

According to this configuration, it is confirmed that the foot brake operates normally under the operation control of the electric actuator through the operation confirmation process performed in advance in a state in which autonomous drive of the work vehicle is possible in the autonomous drive mode.

A second characteristic configuration of the present invention, further includes:
  a first operation sensor that detects an operation of the electric actuator; and
  a second operation sensor that detects an operation of the foot brake, wherein
  the operation confirmation process includes a first operation confirmation process for confirming whether the electric actuator is operating normally based on detection information from the first operation sensor, and a second operation confirmation process for confirming whether the foot brake is operating normally based on the detection information from the second operation sensor.

According to this configuration, in the operation confirmation process, the operation confirmation of the electric actuator that operates the foot brake and the operation confirmation of the foot brake are performed individually.

As a result, the operation confirmation process can be performed with high accuracy, and the reliability of the operation confirmation process can be improved.

In a third characteristic configuration of the present invention, the control unit performs a pre-condition determination process for determining whether or not a condition for starting the operation confirmation process is established when the operation confirmation process is performed, and performs the operation confirmation process when the establishment of the condition for starting the operation confirmation process is confirmed in the pre-condition determination process.

According to this configuration, for example, by including in the condition for starting the operation confirmation process the brake pedal being in the depression release position, it is possible to prevent the operation confirmation process from being performed while the brake pedal is depressed, and the load applied to the electric actuator is reduced.

That is, by setting the condition for starting the operation confirmation process so that the operation confirmation process can be performed in the same state as when the foot brake is operated under the operation control of the electric actuator during the actual autonomous driving, it is possible to avoid a decrease in reliability of the operation confirmation process due to the operation confirmation process being performed in a state different from the actual state.

In a fourth characteristic configuration of the present invention, when the control unit transitions to the operation confirmed state, the control unit performs a valid period determination process for determining whether or not a valid period of the operation confirmed state has elapsed; when the valid period of the operation confirmed state has elapsed in the autonomous drive mode, the control unit transitions the drive mode from the autonomous drive mode to the manual drive mode and transitions from the operation confirmed state to an initial state; and when a normal operation of the foot brake is reconfirmed in the operation confirmation process, the control unit transitions to the operation confirmed state and permits a transition to the autonomous drive mode.

According to this configuration, for example, when the work vehicle is autonomously driven for several days, the operation check process is performed regularly. Therefore, by using the work vehicle for several days, any failure that affects the braking operation in the electric actuator, the foot brake, etc., can be found through the operation confirmation process.

As a result, when it becomes necessary to operate the foot brake under the operation control of the electric actuator during autonomous drive, the risk of the foot brake not operating normally can be effectively suppress.

In a fifth characteristic configuration, when the control unit transitions to the operation confirmed state, the control unit performs a valid period determination process for determining whether or not the valid period of the operation confirmed state has elapsed, and when the valid period of the operation confirmed state has elapsed in the manual drive mode, the control unit provides a notification on the elapse of the valid period.

According to this configuration, the passenger manually driving the work vehicle can be notified in advance about the necessity of the operation confirmation process when the drive mode is transitioned to the autonomous drive mode.

During manual drive in which the foot brake is not operated under the operation control of the electric actuator, it is possible to prevent a decrease in work efficiency due to the operation confirmation process being performed regularly.

DESCRIPTION OF EMBODIMENTS

An embodiment in which a work vehicle according to the present invention is applied to a tractor will now be described as an example of an embodiment of the present invention, with reference to the drawings.

Note that, besides a tractor, the work vehicle according to the present invention may be applied to a passenger work vehicle, such as a riding mower, a riding rice transplanter, a combine, a carrier, a wheel loader, or a snowplow.

Figure 1:
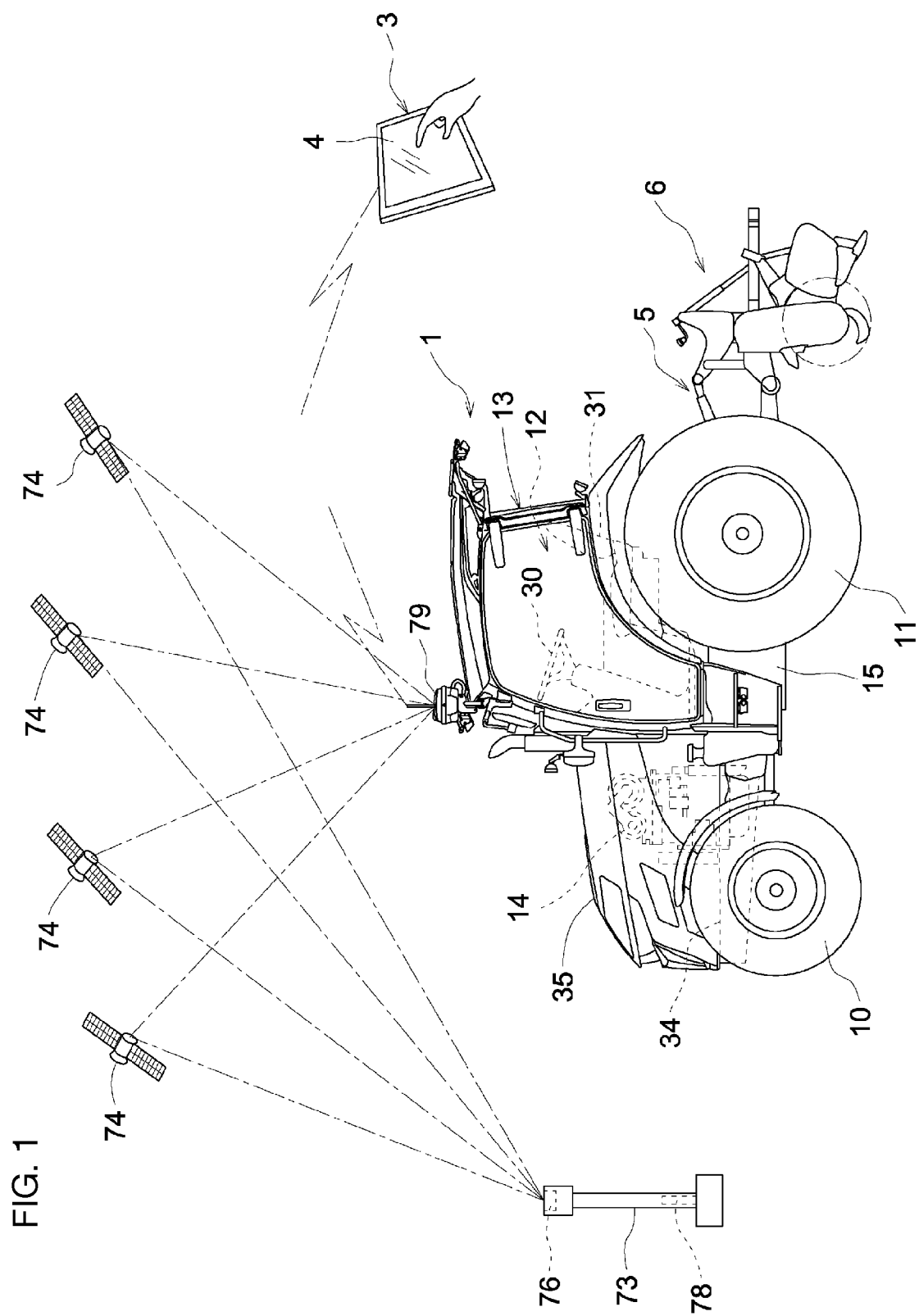
FIG. 1 is a diagram illustrating the schematic configuration of an autonomous drive system.
Figure 2:
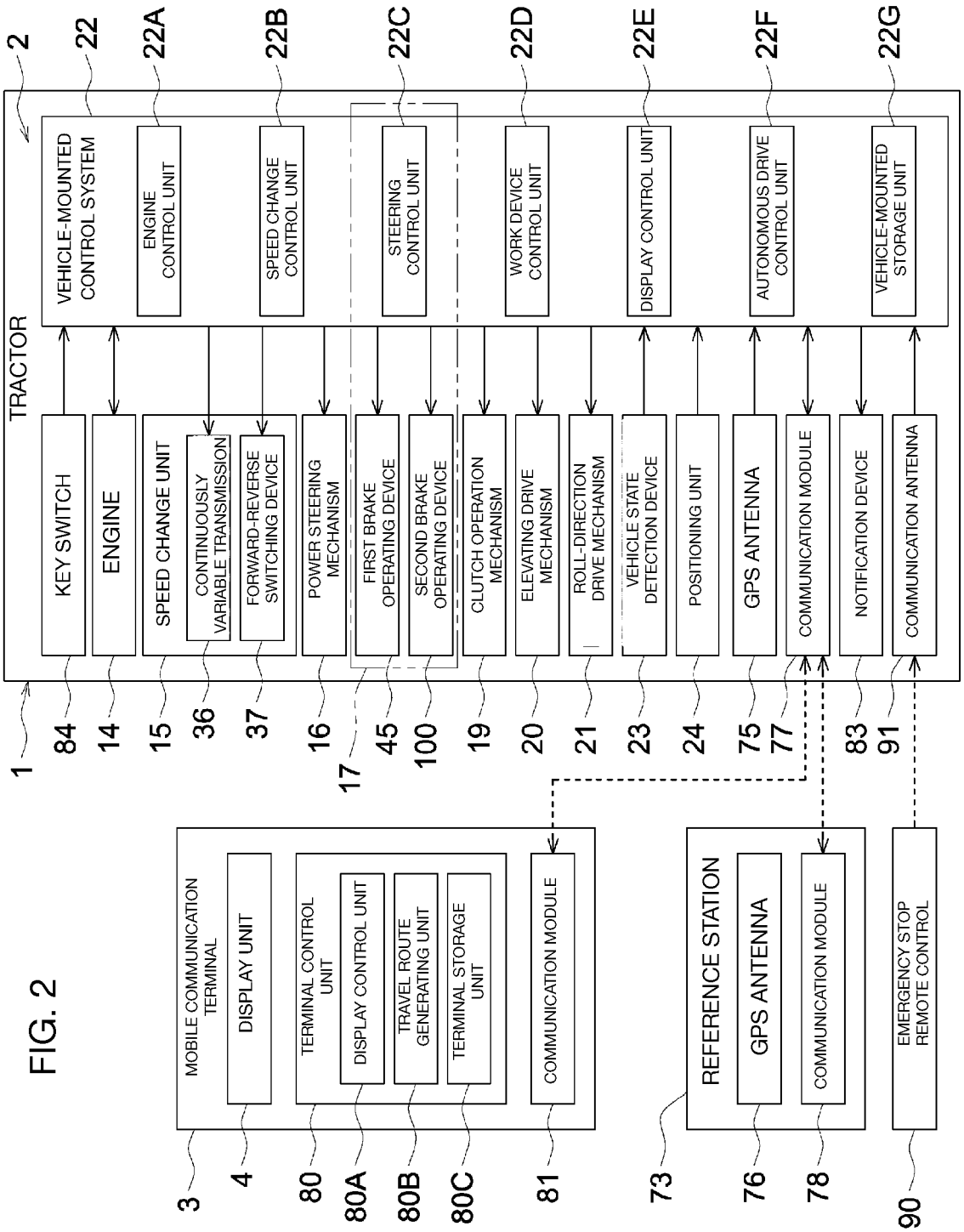
FIG. 2 is a block diagram illustrating the schematic configuration of an autonomous drive system.

As illustrated in FIGS. 1 and 2, a tractor 1 exemplified by the present embodiment is capable of autonomous driving by an autonomous drive system for work vehicles in a field or the like, which is an example of a work area. The autonomous drive system includes an autonomous drive unit 2 and a mobile communication terminal 3. The autonomous drive unit 2 is installed in the tractor 1. The mobile communication terminal 3 is an example of a wireless communication device set up to wirelessly communicate with the autonomous drive unit 2. The mobile communication terminal 3 may be a tablet-type personal computer or a smart phone including a multi-touch type display unit (for example, a liquid crystal panel) 4 for displaying information regarding autonomous drive.

As illustrated in FIG. 1, a rear portion of the tractor 1 is coupled to a rotary tiller 6 via a three-point link mechanism 5 such that the rotary tiller 6 can be raised, lowered, and rolled. The rotary tiller 6 is an example of a work device. In this way, the tractor 1 is configured for rotary tilling specifications.

Note that, in place of the rotary tiller 6, the rear portion of the tractor 1 may be coupled to various work devices, such as a plow, a disc harrow, a cultivator, a subsoiler, a seed planter, a spraying device, and a grass cutter.

Figure 3:
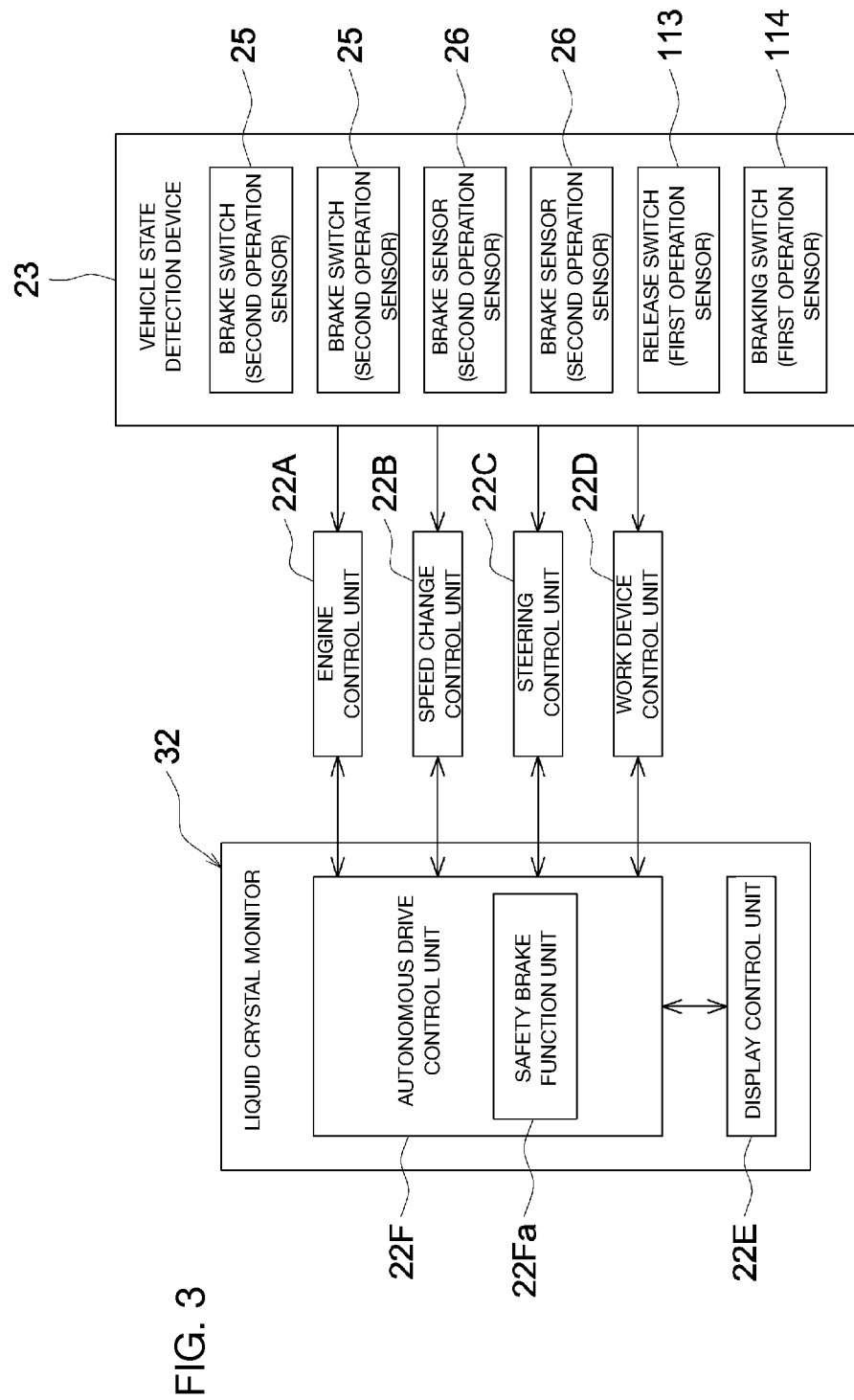
FIG. 3 is a block diagram illustrating the schematic configuration related to a safety brake function.

As illustrated in FIGS. 1 to 3, the tractor 1 includes drivable and steerable left and right front wheels 10 and drivable left and right rear wheels 11, which function as a wheel-type driving device; a cabin 13 that defines a boarding-type driver unit 12; an electronically controlled diesel engine (hereinafter referred to as "engine") 14 including a common rail system; a speed change unit 15 that varies the power from the engine 14; a fully hydraulic power steering mechanism 16 that steers the left and right front wheels 10; a brake system 17 that brakes the left and right rear wheels 11; an electronically controlled clutch operation mechanism 19 that enables hydraulic operation of a work clutch that engages/disengages the power transmitted to the rotary tiller 6; an electrohydraulically controlled elevating drive mechanism 20 that drives the rotary tiller 6 to raise/lower the rotary tiller 6; an electrohydraulically controlled roll-direction drive mechanism 21 that drives the rotary tiller 6 in the roll direction; a vehicle-mounted control system 22 including various control units; a vehicle state detection device 23 that includes various sensors and switches for detecting the various setting statuses and operation states of various parts of the tractor 1; and a positioning unit 24 that measures the current position, the current orientation, etc., of the tractor 1.

Note that the engine 14 may be an electronically controlled gasoline engine including an electronic governor. The power steering mechanism 16 may be an electric power steering mechanism including an electric motor.

As illustrated in FIGS. 1 and 3 to 5, the driver unit 12 includes various operation levers, such as an accelerator lever and a speed change lever; various operation pedals, such as an accelerator pedal 28 and a clutch pedal 29; a steering wheel 30 that enables manual steering of the left and right front wheels 10 via the power steering mechanism 16; a seat 31 for a passenger; and a multi-touch type liquid crystal monitor 32 serving as a display unit that displays various types of information including information related to autonomous drive and enables an input operation.

As illustrated in FIG. 1, the cabin 13 is supported in a vibration-proof manner by a front frame 34 disposed on the front side of the tractor 1 and the speed change unit 15 also serving as a rear frame, via anti-vibration rubber or the like. The engine 14 is supported in a vibration-proof manner by the front frame 34 via vibration-proof rubber or the like. The engine 14 is covered by a bonnet 35 provided on the front side of the tractor 1.

As illustrated in FIG. 2, the speed change unit 15 includes an electronically controlled continuously variable transmission 36 that varies the power from the engine 14; an electrohydraulically controlled forward-reverse switching device 37 that switches the power that has been varied by the continuously variable transmission 36 between forward travel and reverse travel; and a rear wheel differential that allows difference between the left and right rear wheels 11. The continuously variable transmission 36 is implemented by an integrated hydrostatic mechanical transmission (I-HMT), which is an example of a hydromechanical continuously variable transmission having transmission efficiency higher than that of a hydrostatic transmission (HST). The forward-reverse switching device 37 includes a hydraulic clutch for interrupting forward power, a hydraulic clutch for interrupting reverse power, and a solenoid valve for controlling the flow of oil to the clutches.

Note that, in place of the I-HMT, the continuously variable transmission 36 may be implemented by a hydraulic mechanical transmission (HMT), which is an example of a hydromechanical continuously variable transmission, a hydrostatic transmission (HST), a belt-type continuously variable transmission, or the like. In place of the continuously variable transmission 36, the speed change unit 15 may include an electrohydraulically controlled stepped transmission including multiple hydraulic clutches for speed change and multiple solenoid valves for controlling the flow of oil to the clutches.

As illustrated in FIGS. 4 to 7, the brake system 17 includes left and right brake pedals 40 and a parking lever 41 provided in the driver unit 12; left and right brakes 42 for respectively braking the left and right rear wheels 11; left and right first linkage mechanisms 43 that link the left and right brake pedals 40 and the left and right brakes 42, respectively, in conjunction with each other; a second linkage mechanism 44 for parking that couples the parking lever 41 and the left and right brakes 42 in conjunction with each other; and an electrohydraulically controlled first brake operating device 45 that operates the brake 42 on the inner side of the turn in conjunction with steering of the left and right front wheels 10 by a set angle or more. When a passenger depresses at least one of the left and right the brake pedals 40, pulls up the parking lever 41 to a braking position, or steers the left and right front wheels 10 with the steering wheel 30 by a set angle or more, the brake system 17 operates the corresponding brake(s) 42 to brake the corresponding rear wheel(s) 11. Thus, when the left and right brake pedals 40 are depressed at the same time, the left and right brakes 42 function as foot brakes that simultaneously brake the left and right rear wheels 11. When the parking lever 41 is pulled up, the left and right brakes 42 function as parking brakes that simultaneously brake the left and right rear wheels 11. When at least one of the brake pedals 40 are depressed or when the left and right front wheels 10 are steered by a set angle or more, the left and right brakes 42 function as side brakes that brake the at least one of the rear wheels 11. An urging member, such as a compression spring, is disposed inside each of the left and right brakes 42. The urging member urges each of the brakes 42 to return the rear wheel 11 in a braking state in which the rear wheels 11 is being braked to a released state in which the braking of the rear wheel 11 is released.

As illustrated in FIGS. 2 and 3, the vehicle-mounted control system 22 includes an engine control unit 22A that performs control related to the engine 14; a speed change control unit 22B that performs control related to the continuously variable transmission 36, the forward-reverse switching device 37, etc.; a steering control unit 22C that performs control related to the power steering mechanism 16, the first brake operating device 45, etc.; a work device control unit 22D that performs control related to work devices, such as the rotary tiller 6; a display control unit 22E that controls the display operation of the liquid crystal monitor 32; an autonomous drive control unit 22F that performs control related to autonomous drive; and a non-volatile vehicle-mounted storage unit 22G that sores preliminarily generated target travel routes for autonomous drive. Each of the control units 22A to 22F is constructed by an electronic control unit in which a microcontroller controller, etc., are integrated and various control programs. As illustrated in FIG. 3, the autonomous drive control unit 22F is included in the liquid crystal monitor 32 together with the display control unit 22E. The control units 22A to 22F are connected such that they can communicate with each other via a controller area network (CAN).

As illustrated in FIG. 3, "vehicle state detection device 23" is a term collectively referring to various sensors and switches provided in the respective parts of the tractor 1. The vehicle state detection device 23 includes an accelerator sensor that detects the operation amount of the accelerator lever and the accelerator pedal 28 from idling positions; a speed change sensor that detects the operation amount of the speed change lever from a zero speed position; a reverser sensor that detects the operation position of the reverser lever for switching between forward travel and reverse travel; left and right brake switches 25 (see FIG. 3) that detect whether or not the left and right brake pedals 40 are at depression release positions; left and right brake sensors 26 (see FIG. 3) that detect the operation amount of the left and brake pedals 40 from depression release positions; a rotation sensor that detects the output rotation speed of the engine 14; a vehicle speed sensor that detects the vehicle speed of the trucker 1; and a steering angle sensor that detects the steering angle of the front wheels 10.

The engine control unit 22A performs engine speed change control on the basis of detection information from the accelerator sensor and detection information from the rotation sensor. The engine speed change control changes the engine speed from an idling speed to a speed corresponding to the operation amount of the accelerator lever or the accelerator pedal 28.

The speed change control unit 22B performs speed change control, forward-reverse switching control, brake speed change control, and other control. The speed change control controls the operation of the continuously variable transmission 36 so that the vehicle speed of the tractor 1 varies to a speed corresponding to the operation amount of the speed change lever on the basis of the detection information from the speed change sensor, the detection information from the vehicle speed sensor, etc. The forward-reverse switching control switches the power transmission state of the forward-reverse switching device 37 on the basis of the detection information from the reverser sensor. The brake speed change control controls the operation of the continuously variable transmission 36 so that the vehicle speed of the tractor 1 decreases from a speed corresponding to the operation amount of the speed change lever to a speed corresponding to the depression operation amount of the left and right brake pedals 40 when the left and right brake pedals 40 are simultaneously operated, on the basis of the detection information from each of the brake sensors 26 and the detection information from the vehicle speed sensor. The speed change control includes a deceleration stop process of decelerating the continuously variable transmission 36 to a zero speed state and stopping the driving of the tractor 1 when the speed change lever is operated to a zero speed position. The braking speed change control includes a braking deceleration stop process of decelerating the continuously variable transmission 36 to a zero speed state and thereby stopping the driving of the tractor 1 when the left and right brake pedals 40 are depressed to a depression limit position.

As illustrated in FIGS. 4 to 7, the left and right brake pedals 40 of the brake system 17 are disposed next to each other in the right front lower portion of the driver unit 12. The left and right brake pedals 40 are urged by left and right extension springs 46 to return to depression release positions. The left and right brake pedals 40 include boss portions 40A, pedal arm portions 40B, and pedal portions 40C. The boss portions 40A are supported by a rotary shaft 47 for pedal support that extends in the left-right direction below and forward of the steering wheel 30. The pedal arm portions 40B extend rearward and downward from the boss portions 40A. The pedal portions 40C are attached to the free ends of the pedal arm portions 40B. The boss portion 40A of the right brake pedal 40 rotates relative to the rotary shaft 47. The right brake pedal 40 includes a linkage arm portion 40D that extends forward and downward from the boss portion 40A. The boss portion 40A of the left brake pedal 40 rotates integrally with a linkage arm 48 via the rotary shaft 47. The linkage arm 48 is fixed to the left end of the rotary shaft 47.

Figure 4:
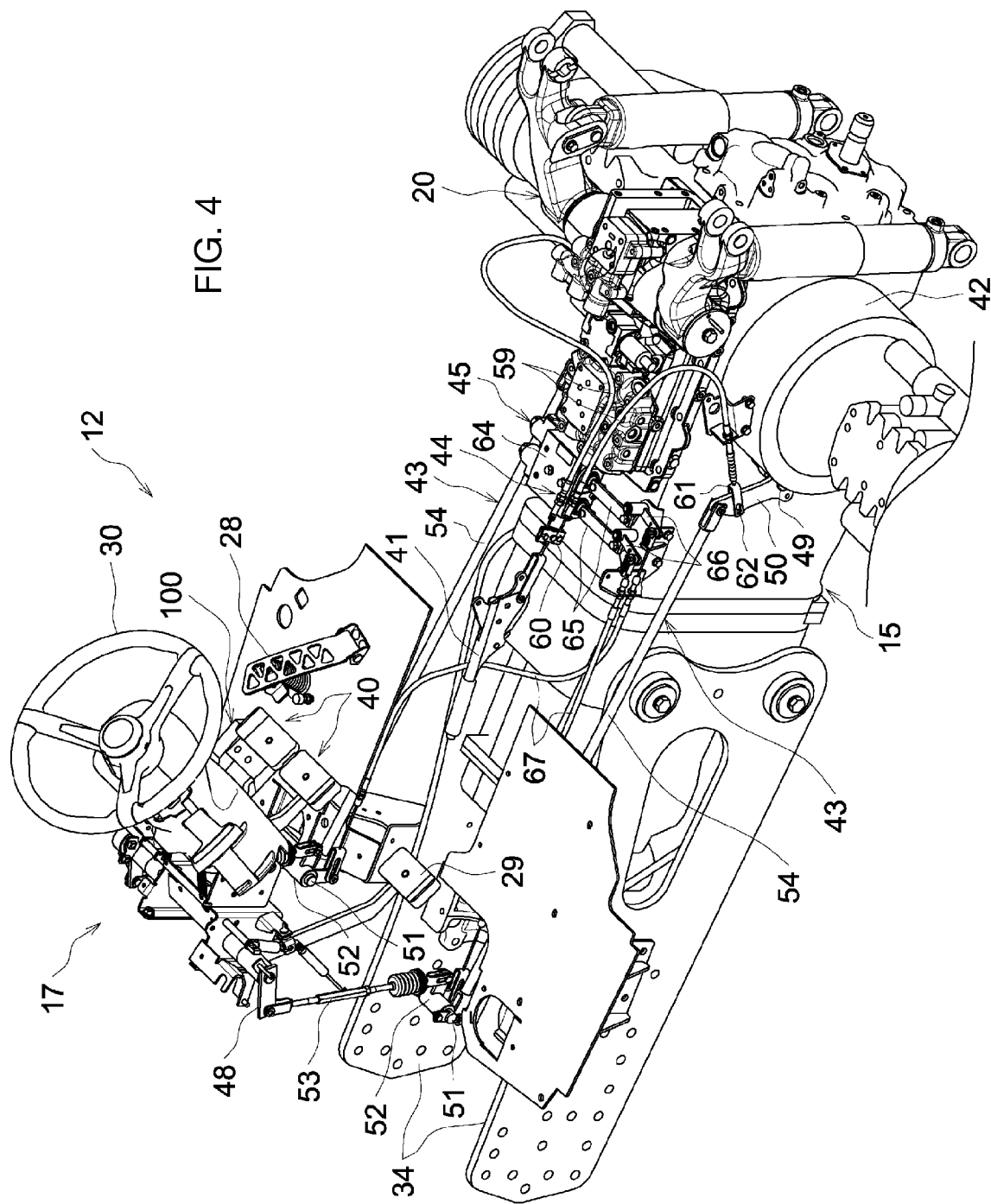
FIG. 4 is a perspective view from the upper left rear side of a main portion illustrating the configuration of a brake system.
Figure 5:
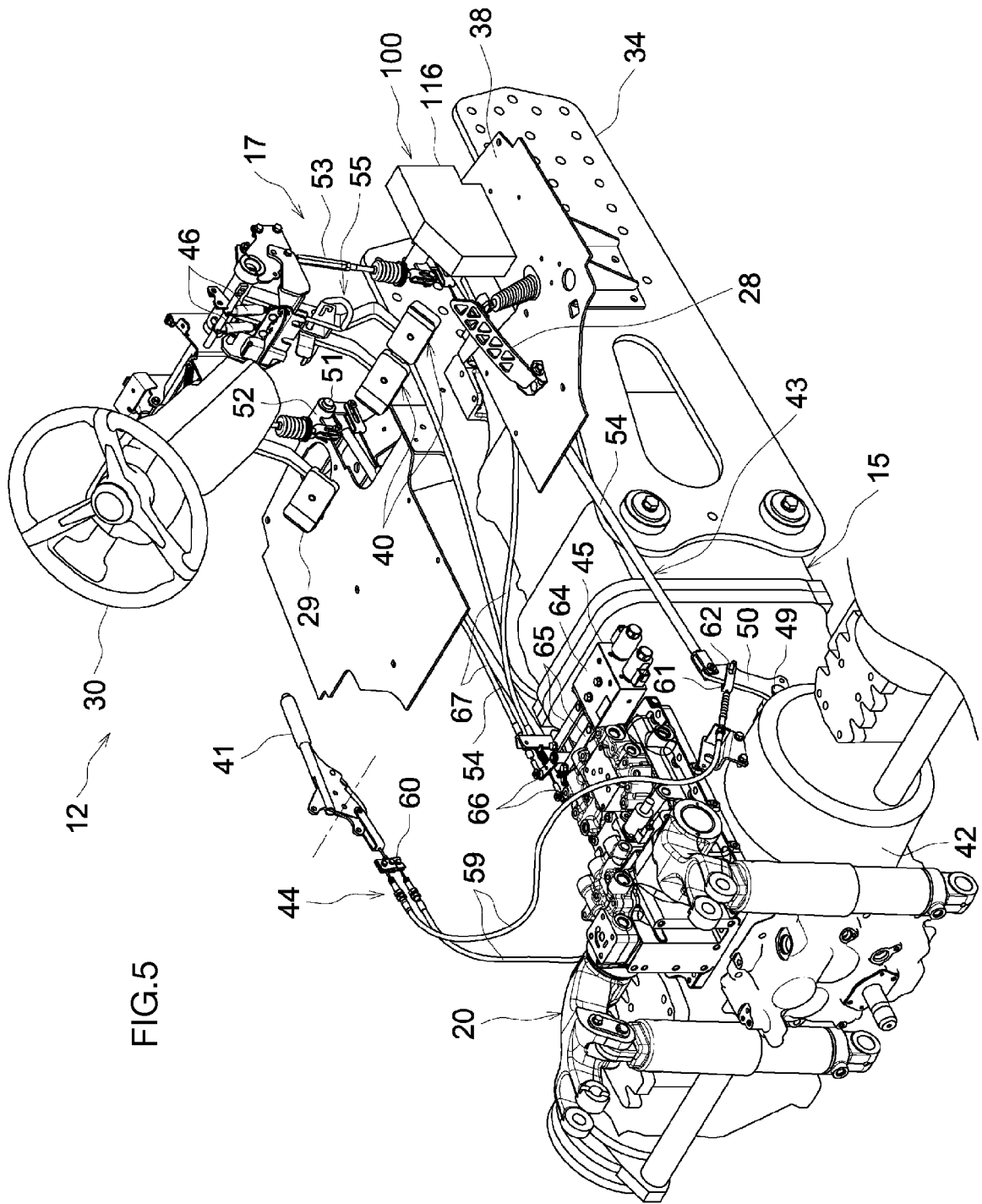
FIG. 5 is a perspective view from the upper right rear side of a main portion illustrating the configuration of a brake system.

As illustrated in FIGS. 4 and 5, the left and right brakes 42 are included in the speed change unit 15. Each of the left and right brakes 42 includes an operation shaft 49 and an operation arm 50. The operation shaft 49 protrudes from the front end of the corresponding brake 42 in a transversely outward direction from the vehicle. The operation arm 50 is fixed to the protruding end of the operation shaft 49.

As illustrated in FIGS. 4 to 7, the left and right first linkage mechanisms 43 includes boss members 52, first linking rods 53, and second linking rods 54. The boss members 52 are rotatably supported by left and right fixed shafts 51 that extend in the left-right direction below the rotary shaft 47. Each of the first linking rods 53 is vertically long and extends between a first arm portion 52A of the corresponding boss members 52 and the linkage arm portion 40D of the right brake pedal 40 (or the linkage arm 48). The second linking rods 54 are long in the front-back direction and extend between second arm portions 52B of the boss members 52 and the operation arms 50 of the brakes 42. The left first linkage mechanism 43 includes the rotary shaft 47 and the linkage arm 48 described above. That is, the left and right first linkage mechanisms 43 are of a rod linkage type in which the left and right brake pedals 40 are respectively linked to the left and right brakes 42 via the first linking rods 53, the second linking rods 54, etc.

In the brake system 17 having the configuration described above, when only the right brake pedal 40 is depressed, the resulting operating force is transmitted to the operation arm 50 of the right brake 42 via the right first linkage mechanism 43. As a result, the brake system 17 switches to a right braking state in which the right rear wheel 11 is braked by the right brake 42. When the depression operation of the right brake pedal 40 is then released, the right braking state switches to a released state.

When only the left brake pedal 40 is depressed, the resulting operating force is transmitted to the operation arm 50 of the left brake 42 via the left first linkage mechanism 43. As a result, the brake system 17 switches to a left braking state in which the left rear wheel 11 is braked by the left brake 42. When the depression operation of the left brake pedal 40 is then released, the left braking state switches to a released state.

When the left and right brake pedals 40 are both depressed, the resulting operating force is transmitted to the operation arms 50 of the left and right brakes 42 via the left and right first linkage mechanisms 43. As a result, the brake system 17 switches to a braking state in which the left and right rear wheels 11 are respectively braked by the left and right brakes 42. When the depression operation of the left and right brake pedals 40 is then released, the braking state switches to a released state.

In this way, when the passenger manually drives the tractor 1, the passenger can perform a brake-turn of the tractor 1 to reduce the turning radius of the tractor 1 by depressing the brake pedal 40 on the inner side of the turn while operating the steering wheel 30 in the turning direction. The passenger can depress both the left and right brake pedals 40 to brake and decelerate or brake and stop the tractor 1 while the tractor 1 is kept in a straight-ahead orientation as a result of the braking action of the left and right brakes 42 and the braking speed change control of the speed change control unit 22B described above.

As illustrated in FIGS. 6 to 12, the brake system 17 includes a coupling mechanism 55 that switches the left and right brake pedals 40 between a coupled state and a released state. In the coupled state, the left and right brake pedals 40 are coupled. In the released state, the coupled state of the left and right brake pedals 40 is released. The coupling mechanism 55 includes an operation rod 56, a compression spring 57, a guide plate 58. The operation rod 56 is supported by the right brake pedal 40 so as to be movable in the left-right direction. The compression spring 57 urges the left end of the operation rod 56 to cause the operation rod 56 to protrude toward the left brake pedal 40. The guide plate 58 guides a guided portion 56A of the operation rod 56. The guide plate 58 has a J-shaped guide hole 58a that guides the guided portion 56A of the operation rod 56 between a couple position and a release position. The left brake pedal 40 has a through-hole 40E (see FIGS. 8, 11, and 12) into which the left end of the operation rod 56 is passed when the guided portion 56A of the operation rod 56 is at the couple position.

In the coupling mechanism 55 having the above-described configuration, when the operation rod 56 is operated so that the guided portion 56A of the operation rod 56 is positioned at the couple position, the left end of the operation rod 56 passes through the through-hole 40E of the left brake pedal 40. As a result, the left and right brake pedals 40 switches to a coupled state, and the coupled state is held by the compression spring 57. In the coupling mechanism 55, when the operation rod 56 is operated so that the guided portion 56A of the operation rod 56 is positioned at the release position, the left end of the operation rod 56 is removed from the through-hole 40E of the left brake pedal 40. As a result, the left and right brake pedals 40 switches to a released state, and the released state is held by the compression spring 57.

In this way, when the passenger manually drives the tractor 1 in a field, the passenger can operate the operation rod 56 and switch the coupling mechanism 55 to a released state, to perform any necessary brake-turns while driving in the field. When the passenger manually drives the tractor 1 outside the field, the passenger operates the operation rod 56 and switches the coupling mechanism 55 to a coupled state, to prevent the risk of performing unnecessary brake-turns while driving outside the field.

In the brake system 17, the parking lever 41 is disposed to the left of the seat 31 in the driver unit 12. The parking lever 41 is of a two-position switching type that switches and holds two positions: an upper braking position and a lower release position. At the upper braking position, the left and right brakes 42 are switched to a braking state. At the lower release position, the left and right brakes 42 are switched to a released state. The operation of the parking lever 41 to the braking position is detected by a parking switch included in the vehicle state detection device 23.

As illustrated in FIGS. 4 to 5, the second linkage mechanism 44 for parking includes left and right control cables 59, an equalizer unit 60, left and right link plates 61, and left and right linking pins 62. The equalizer unit 60 couples one of the ends of inner cables of the left and right control cables 59 to the parking lever 41. The left and right link plates 61 and the left and right linking pins 62, couple other ends of the left and right inner cables to the operation arms 50 of the left and right brakes 42. That is, the second linkage mechanism 44 is of a cable linkage type in which the parking lever 41 is linked to the left and right brakes 42 via the left and right control cables 59, etc. The left and right link plates 61 have long holes through which the linking pins 62 fixed to the left and right operation arms 50 are passed. The long holes function as allowance portions that allow displacement of the left and right operation arms 50 relative to the left and right link plates 61 in conjunction with the depressing operation of the left and right brake pedals 40.

In the brake system 17 having the above-described configuration, when the parking lever 41 is pulled up from the lower release position to the upper braking position and held in the braking position, the resulting operating force is transmitted to the operation arms 50 of the left and right brakes 42 via the second linkage mechanism 44. As a result, the left and right rear wheels 11 are respectively braked by the left and right brakes 42, and the braked state switches to a parking brake state in which the braking state is kept. When the parking lever 41 is then pushed down from the upper braking position to the lower release position and held in the release position, the parking brake state is switched to a released state.

Figure 6:
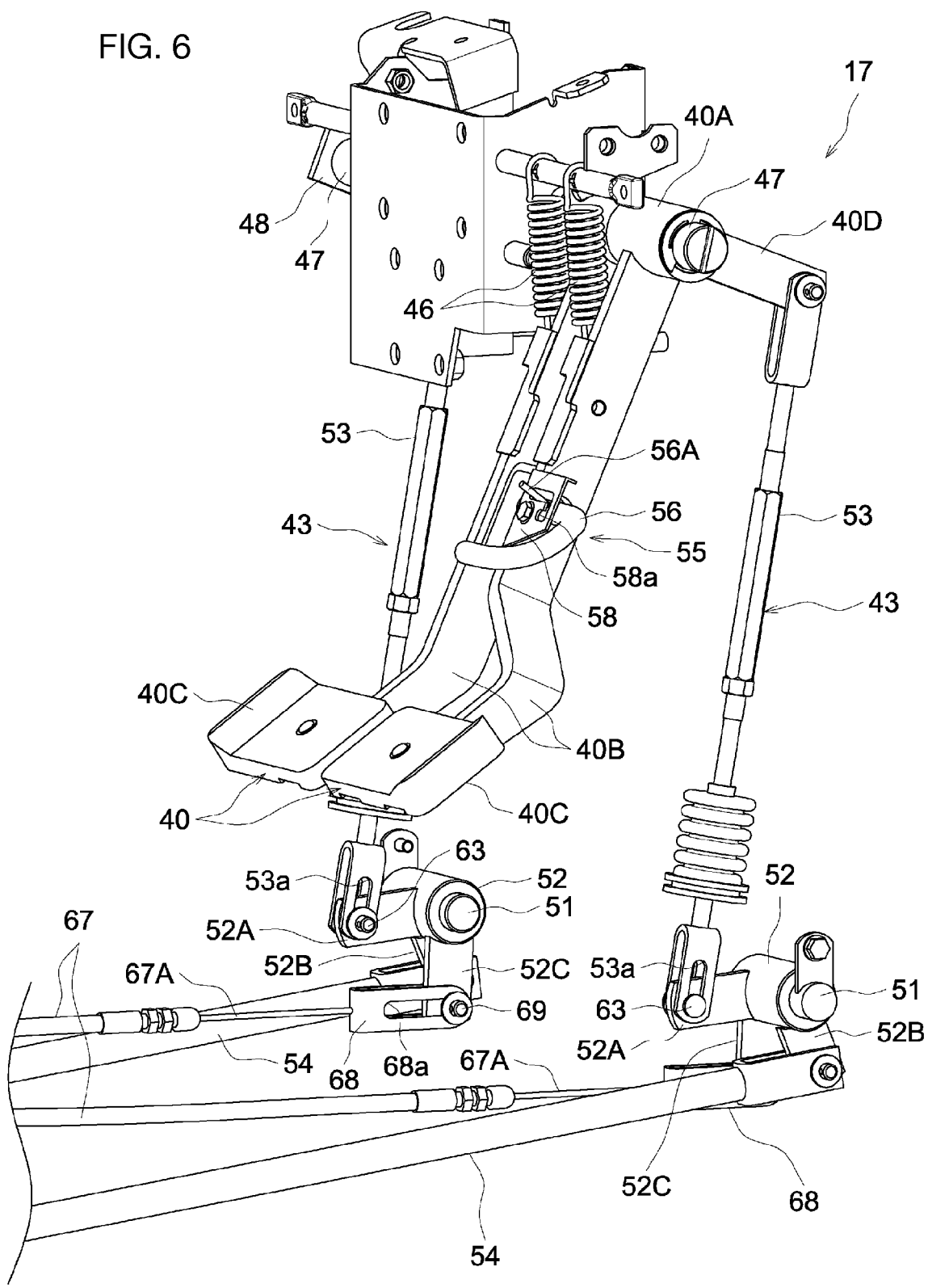
FIG. 6 is a perspective view of a main portion of a brake system illustrating the configuration of brake pedals and the vicinity.
Figure 7:
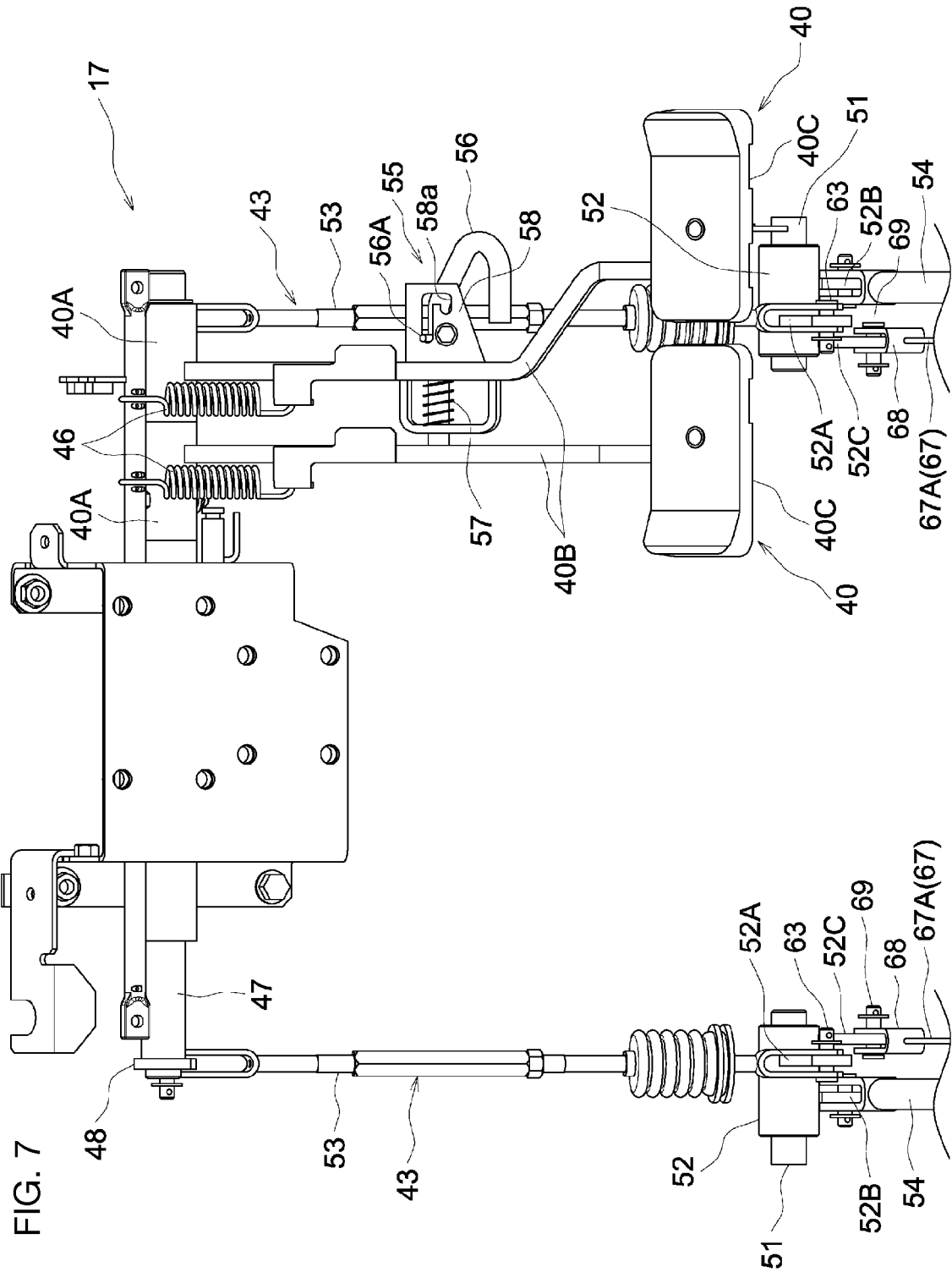
FIG. 7 is a rear view of a main portion of a brake system illustrating the configuration of brake pedals and the vicinity.

As illustrated in FIG. 6, vertically long holes 53a are formed in the lower end portions of the first linking rods 53 in the left and right first linkage mechanisms 43. Linking pins 63 fixed to the first arm portions 52A of the boss members 52 are passed through the long holes 53a. As illustrated in FIGS. 3 to 5, in the left and right first linkage mechanisms 43, when the left and right brakes 42 are switched from the released state to the parking brake state as a result of the parking lever 41 being pulled up, in conjunction with this switching, the left and right second linking rods 54 are pulled rearward, and the second arm portions 52B of the left and right boss members 52 swing to be displaced rearward. In conjunction with the swing displacement, the first arm portions 52A of the left and right boss members 52 swing to be displaced upward. At this time, the long holes 53a of the first linking rods 53 function as allowance portions that allow the upward swing displacement of the left and right first arm portions 52A relative to the left and right first linking rods 53. This avoids a reduction in operability due to the left and right brake pedals 40 interlocking and causing the operation to become heavy when the left and right brakes 42 switch to a parking brake state as a result of the parking lever 41 being pulled up.

As illustrated in FIGS. 4 to 7, the first brake operating device 45 in the brake system 17 includes a hydraulic unit 64 for automatic brake, a pair of push-pull links 65, a pair of crank arms 66, left and right control cables 67, left and right link plates 68, and left and right linking pins 69. The hydraulic unit 64 includes two hydraulic cylinders and two solenoid valves corresponding to the left and right brakes 42. The push-pull links 65 are pushed and pulled by the hydraulic unit 64. The crank arms 66 swing around the longitudinal axis in conjunction with the push-pull links 65. The left and right control cables 67 extend from the crank arms 66 toward the left and right boss members 52. The left and right link plates 68 and the left and right linking pins 69 couple the front ends of inner cables 67A of the left and right control cables 67 to third arm portions 52C of the left and right boss members 52. Oil from a hydraulic pump driven by power from the engine 14 is supplied to the hydraulic unit 64. The left and right link plates 68 have long holes 68a through which linking pins 69 fixed to the left and right third arm portions 52C are passed. The long holes 68a function as allowance portions that allow depression of the left and right brake pedals 40 or swing displacement of the left and right third arm portions 52C relative to the left and right link plates 68 caused by a pulling operation of the parking lever 41.

As illustrated in FIG. 2, the brake system 17 includes the steering control unit 22C. When a selection switch for automatic brake included in the driver unit 12 is operated to select an automatic brake mode, the steering control unit 22C controls the operation of the hydraulic unit 64 of the first brake operating device 45 on the basis of the detection by the steering angle sensor and executes automatic brake control for operating the left and right brakes 42. Under the automatic brake control, the steering control unit 22C keeps each of the solenoid valves of the hydraulic unit 64 in a discharge state in which oil is discharged from each hydraulic cylinder while the steering angle of the left and right front wheels 10 is less than a set angle. In this way, the steering control unit 22C keeps the left and right hydraulic cylinders in a contracted state and the left and right brakes 42 in a released state. When the steering angle of the left and right front wheels 10 reaches the set angle or more, the solenoid valves corresponding to the rear wheel 11 on the inner side of the turn switch to a supply state in which oil is supplied to the hydraulic cylinders so as to extend the hydraulic cylinder corresponding to the rear wheel 11 on the inner side of the turn and switch the brake 42 on inner side of the turn to a braking state.

During manual driving in which the automatic brake mode is selected, the brake system 17 having the above-described configuration keeps the left and right brakes 42 in a released state by the first brake operating device 45 while the steering angle of the left and right front wheels 10 based on the turning operation of the steering wheel 30 is smaller than the set angle. As a result, the turning state of the tractor 1 is kept in a normal turning state in which the tractor 1 turns with a turning radius corresponding to the steering angle of the left and right front wheels 10. When the steering angle of the left and right front wheels 10 based on the turning operation of the steering wheel 30 reaches the set angle or larger, the first brake operating device 45 switches the brake 42 on the inner side of the turn to a braking state. As a result, the turning state of the tractor 1 switches to a brake-turn state in which the tractor 1 turns with a turning radius smaller than the turning radius in the normal turning state. Subsequently, when the steering angle of the left and right front wheels 10 based on the turning operation of the steering wheel 30 falls below the set angle, the first brake operating device 45 switches the left and right brakes 42 to a released state. As a result, the turning state of the tractor 1 switches to the normal turning state described above.

That is, when the passenger selects the automatic brake mode during manual driving by the passenger, and during turning in which the left and right front wheels 10 are steered by the set angle or more, the brake system 17 automatically switches the turning state of the tractor 1 between the normal turning state and the brake-turn state on the basis of whether the angle of the left and right front wheels 10 being less than the set angle or larger than or equal to the set angle, without the passenger depressing the brake pedal 40 on the inner side of the turn. As a result, the passenger can readily turn the tractor 1 with a small radius by only turning the steering wheel 30.

As illustrated in FIG. 6, the lower ends of the first linking rods 53 of the left and right first linkage mechanisms 43 have long holes 53a that function as allowance portions, as described above. As a result, even when the left and right brake pedals 40 are coupled by the coupling mechanism 55, the first brake operating device 45 can operate the brake 42 on the inner side of the turn when the left and right front wheels 10 are steered by the set angle or more, and switch the turning state of the tractor 1 to a brake-turn state.

The positioning unit 24 includes a satellite navigation device and an inertial measurement unit (IMU). The satellite navigation device measures the current position and the current orientation of the tractor 1 by using a global positioning system (GPS), which is an example of a navigation satellite system (NSS). The IMU includes a three-axis gyroscope, a three-direction acceleration sensor, etc., and measures the attitude, the orientation, and the like, of the tractor 1. Positioning methods using a GPS include a differential GPS (DGPS) (which is a relative positioning method) and a real time kinematic GPS (RTK-GPS) (which is an interference positioning method). In the present embodiment, an RTK-GPS suitable for measuring the position of a moving body is employed. Accordingly, a reference station 73 that enables positioning by the RTK-GPS is installed at a known location in the periphery of the field, as illustrated in FIG. 1.

As illustrated in FIGS. 1 and 2, the tractor 1 and the reference station 73 include GPS antennas 75 and 76, respectively, and communication modules 77 and 78, respectively. The GPS antennas 75 and 76 receive radio waves transmitted from GPS satellites 74 (see FIG. 1). The communication modules 77 and 78 enable wireless communication of various data items, including positioning data, between the tractor 1 and the reference station 73. In this way, the satellite navigation system of the positioning unit 24 can measure the current position and current orientation of the tractor 1 with high accuracy on the basis of the positioning data obtained by the GPS antenna 75 on the tractor side receiving radio waves from the GPS satellite 74 and the positioning data obtained by the GPS antenna 76 on the base station side receiving radio waves from the GPS satellite 74. The positioning unit 24, which is provided with a satellite navigation device and an inertial measurement unit, enables highly accurate measurements of the current position, the current orientation, and an attitude angle (yaw angle, roll angle, pitch angle) of the tractor 1.

In the tractor 1, the inertial measurement unit of the positioning unit 24, the GPS antenna 75, and the communication module 77 are included in an antenna unit 79 illustrated in FIG. 1. The antenna unit 79 is disposed at the center of the upper portion in the left and right direction on the front side of the cabin 13.

As illustrated in FIG. 2, the mobile communication terminal 3 includes a terminal control unit 80 and a communication module 81. The terminal control unit 80 includes an electronic control unit on which a microcontroller, etc., are integrated and various control programs. The communication module 81 enables wireless communication of various data items including the positioning data with the communication module 77 on the tractor side. The terminal control unit 80 includes a display control unit 80A, a travel route generating unit 80B, and a non-volatile terminal storage unit 80C. The display control unit 80A controls the operation of a display unit 4. The travel route generating unit 80B generates a target travel route for autonomous drive. The non-volatile terminal storage unit 80C stores the target travel route generated by the travel route generating unit 80B.

The target travel route includes various route section, such as multiple work route sections disposed in parallel at regular intervals corresponding to the work width of the tractor 1 and multiple non-work turning route sections connecting the end and start of adjacent work route sections in the order of travel. The target travel route also includes proper engine speed, proper vehicle speed, traveling direction of the tractor 1, front wheel steering angle at the turning route section, stop position of the tractor 1, etc., that are set in accordance with the drive mode of the tractor 1 in the various turning route sections.

As illustrated in FIG. 3, detection information from various sensors and switches included in the vehicle state detection device 23 is input to the autonomous drive control unit 22F via the speed change control unit 22B, the steering control unit 22C, etc. In this way, the autonomous drive control unit 22F can monitor various setting states of the tractor 1 and operating states of the various parts.

When the display unit 4 of the mobile communication terminal 3 is operated by a user, such as the passenger or an administrator outside of the vehicle, and the start of autonomous drive is instructed while the drive mode of the tractor 1 is switched to an autonomous drive mode, the autonomous drive control unit 22F starts autonomous drive control to cause autonomous drive of the tractor 1 along the target travel route while the positioning unit 24 acquires the current position of the tractor 1.

The autonomous drive control by the autonomous drive control unit 22F includes an autonomous control process for the engine in which a control command for autonomous drive related to the engine 14 is sent to the engine control unit 22A; an autonomous control process for speed change in which a control command for autonomous drive related to the continuously variable transmission 36, the forward-reverse switching device 37, etc., is sent to the speed change control unit 22B; an autonomous control process for steering in which a control command for autonomous drive related to steering is sent to the steering control unit 22C; and an autonomous control process for work in which a control command for autonomous drive related to work devices, such as the rotary tiller 6, is sent to the work device control unit 22D.

In the autonomous control process for the engine, the autonomous drive control unit 22F sends, to the engine control unit 22A, an engine speed change command for instructing a change in engine speed on the basis of the proper engine speed or the like included in the target travel route and an engine stop command for instructing the engine 14 to stop on the basis of the establishment of an engine stop condition.

In the autonomous control process for speed change, the autonomous drive control unit 22F sends, to the speed change control unit 22B, a speed change operation command for instructing the continuously variable transmission 36 to change speed on the basis of the proper vehicle speed included in the target travel route, a forward-reverse switching command for instructing the forward-reverse switching device 37 to switch between forward travel and reverser travel on the basis of the travel direction of the tractor 1 included in the target travel route, a neutral switching command for instructing the forward-reverse switching device 37 to switch to a neutral state on the basis of the establishment of a travel power cutoff condition.

In the autonomous control process for steering, the autonomous drive control unit 22F sends, to the steering control unit 22C, a steering command for instructing the steering of the left and right front wheels 10 on the basis of the front wheel steering angles or the like in the target travel route.

In the autonomous control process for work, the autonomous drive control unit 22F sends, to the work device control unit 22D, a work start command for instructing the rotary tiller 6 to switch to a work state on the basis of the work state point included in the target travel route and a work stop command for instructing the rotary tiller 6 to switch to a non-work state on the basis of the work stop point included in the target travel route.

Note that, in regard or the engine stop condition and the travel power cutoff condition described above, the autonomous drive control unit 22F determines that the engine stop condition and the travel power cutoff condition have been established when an error is detected on the basis of various items of information from the vehicle state detection device 23, etc. The error is, for example, an error of the speed change control unit 22B, such as a speed change control failure in which the proper vehicle speed differs from the vehicle speed of the tractor 1, or an error in the CAN communication with the speed change control unit 22B and the steering control unit 22C.

The engine control unit 22A performs automatic engine speed change control, automatic engine stop control, etc., in accordance with various control commands related to the engine 14 sent from the autonomous drive control unit 22F in the autonomous control process for the engine. The automatic engine speed change control automatically changes the engine speed. The automatic engine stop control automatically stops the engine 14.

The speed change control unit 22B performs automatic speed change control, automatic forward-reverse switching control, automatic neutral switching control, etc., in accordance with various control commands related to the continuously variable transmission 36, the forward-reverse switching device 37, etc., sent from the autonomous drive control unit 22F in the autonomous control process for speed change. The automatic speed change control automatically controls the operation of the continuously variable transmission 36. The automatic forward-reverse switching control automatically controls the operation of the forward-reverse switching device 37. The automatic neutral switching control automatically switches the forward-reverse switching device 37 to a neutral state so that the power transmitted to the left and right front wheels 10 and the left and right rear wheels 11 are cut off. The automatic speed change control includes an automatic deceleration stop process of decelerating the continuously variable transmission 36 to a zero state and stopping the driving of the tractor 1, for example if the proper vehicle speed included in the target travel route is zero.

The steering control unit 22C performs automatic steering control, automatic brake turning control, etc., in accordance with a steering command sent from the autonomous drive control unit 22F in the autonomous control process for steering. The automatic steering control controls the operation of the power steering mechanism 16 and steers the left and right front wheels 10. The automatic brake turning control operates the first brake operating device 45 and operates the brake 42 on the inner side of the turn if the left and right front wheels 10 are steered at a set angle or more.

The work device control unit 22D performs automatic work start control, automatic work stop control, etc., in accordance with various control commands related to the rotary tiller 6 sent from the autonomous drive control unit 22F in the autonomous control process for work. The automatic work start control controls the operation of the elevating drive mechanism 20 and the clutch operation mechanism 19, lowers the rotary tiller 6 to a work height, and operates the rotary tiller 6. The automatic work stop control stops the rotary tiller 6 and raises the rotary tiller 6 to a non-work height. In a work state in which the rotary tiller 6 is lowered to a work height and operated, the work device control unit 22D performs automatic tillage depth control and automatic roll angle maintenance control. The automatic tillage depth control controls the operation of the elevating drive mechanism 20 and keeps the tillage depth made by the rotary tiller 6 to a set depth on the basis of the detection of a tillage sensor that detects a tillage depth of the rotary tiller 6. The automatic roll angle maintenance control controls the operation of the roll-direction drive mechanism 21 and keeps the tilt of the rotary tiller 6 in the roll direction to a set orientation (for example, a horizontal orientation) on the basis of a tilt sensor that detects the roll angle of the tractor 1 and detection of an acceleration sensor of an inertia measuring unit.

That is, the above-described autonomous drive unit 2 includes a power steering mechanism 16, a clutch operation mechanism 19, an elevating drive mechanism 20, a roll-direction drive mechanism 21, a vehicle-mounted control system 22, a vehicle state detection device 23, a positioning unit 24, and a communication module 77. The proper operation of these components enables accurate autonomous drive of the tractor 1 along the target travel route and proper tillage by the rotary tiller 6. In case of an error in the speed change control unit 22B of the tractor 1 or an error in the CAN communication, the driving of the tractor 1 can be automatically stopped.

As illustrated in FIGS. 2, 4, 5, and 8 to 11, the brake system 17 includes an electric second brake operating device 100 that operates the left and right brake pedals 40 coupled by the coupling mechanism 55 so as to operate the left and right brakes 42 as safety brakes. As illustrated in FIG. 3, the autonomous drive control unit 22F includes a safety brake function unit 22Fa that controls the operation of the second brake operating device 100 so as to cause the left and right brakes 42 to function as safety brakes.

As illustrated in FIGS. 8 to 11, the second brake operating device 100 is disposed on the right side of the right brake pedal 40 in the driver unit 12. The second brake operating device 100 includes an operated body 101, an electric actuator 102, and an allowance portion 103. The operated body 101 is coupled to the right brake pedal 40. The electric actuator 102 operates the operated body 101 in the front-rear direction. The allowance portion 103 allows displacement of the right brake pedal 40, etc., relative to the electric actuator 102 between the right brake pedal 40 and the electric actuator 102, in conjunction with the depression of the brake pedal 40.

As illustrated in FIGS. 8 to 12, the operated body 101 includes a first member 104, a second member 105, a damper 107, and a link plate 108. The first member 104 and a second member 105 are coupled to the pedal arm portions 40B of the right brake pedal 40. The damper 107 is swingably coupled to the second member 105 in the vertical direction via a coupling pin 106 extending in the left-right direction. The link plate 108 is coupled to the damper 107 so that the position of the link plate 108 is adjustable in the front-back direction. A long hole 108a is formed in the link plate 108. The long hole 108a extends in the front-back direction and functions as the allowance portion 103. The electric actuator 102 is an electric motor including a worm reducer 102A. The electric motor 102 is switched between a forward rotation operation state, a reverse rotation operation state, and an operation stop state by the control and operation of the steering control unit 22C. In the forward rotation operation state, forward rotation power is output. In the reverse rotation operation state, reverse rotation power is output. In the operation stop state, the output of rotation power stops. A deceleration gear set 111 and a linking pin 112 are disposed between the operated body 101 and the worm reducer 102A of the electric motor 102. The deceleration gear set 111 includes a small-diameter input gear 109 and a large-diameter output gear 110 and further reduce the power from the worm reducer 102A. The linking pin 112 links the outer circumference of the output gear 110 of the deceleration gear set 111 and the operated body 101 via the allowance portion 103. The linking pin 112 is fixed to the outer circumference of the output gear 110 while being passed through the long hole 108a in the link plate 108. The linking pin 112 moves from a non-operating position (see FIGS. 8 to 11) to a maximum operation position (see FIG. 12), by the forward rotation power from the electric motor 102, and moves from the maximum operation position to the non-operating position by the reverse rotation power from the electric motor 102. At the non-operating position, the right brake pedal 40 (the right brake 42) is not operated. At the maximum operation position, the operation amount of the right brake pedal 40 (the right brake 42) is maximized. The non-operating position of the linking pin 112 is set so that the linking pin 112 is positioned at the front end of the long hole 101a when the right brake pedal 40 is at a depression release position.

With the above-described configuration, when the right brake pedal 40 is depressed, the forward movement of the operated body 101 relative to the linking pin 112 caused by the depression operation is allowed by the allowance of the long hole 108a (the allowance portion 103) of the link plate 108. As a result, when the right brake pedal 40 or the left and right brake pedals 40 are depressed while the tractor 1 is manually driven by the passenger, the right brake 42 or the left and right brakes 42 can be braked in conjunction with the depression by the action of the allowance portion 103, without hinderance by the electric motor 102.

By the electric motor 102 switching to the forward rotation operation state in a state in which the left and right brake pedals 40 are coupled by the coupling mechanism 55, the left and right brake pedals 40 can be moved to a depression limit position, and thereby the left and right brakes 42 can be switched to the braking state. Switching of the electric motor 102 to the reverse rotation operation state moves the left and right brake pedals 40 to the depression release position. As a result, the left and right brakes 42 can be switched to a released state.

A first limit switch 113 is disposed at the non-operating position of the linking pin 112. The first limit switch 113 detects the linking pin 112 reaching the non-operating position by the operation of the electric motor 102. A second limit switch 114 is disposed at the maximum operation position of the linking pin 112. The second limit switch 114 detects the linking pin 112 reaching the maximum operation position by the operation of the electric motor 102. When the left and right brake pedals 40 are coupled by the coupling mechanism 55, the non-operating position of the linking pin 112 is a release position at which the braking by the left and right brakes 42 is released, and the maximum operation position of the linking pin 112 is a braking position at which the braking by the left and right brakes 42 is maximized. In this way, the first limit switch 113 functions as a release switch that detects the linking pin 112 reaching the release position by the operation of the electric motor 102. The second limit switch 114 functions as a braking switch that detects the linking pin 112 reaching the braking position of the linking pin 112 by the operation of the electric motor 102. The release switch 113 and the braking switch 114 function as a first operation sensor for detecting the operation of the electric motor 102.

As illustrated in FIG. 3, the release switch 113 and the braking switch 114 are included in the vehicle state detection device 23 together with the left and right brake switches 25, the left and right brake sensors 26, etc. The vehicle state detection device 23 includes a coupling switch that is turned on when the left and right brake pedals 40 are coupled by the coupling mechanism 55.

When the left and right brake switches 25 detect the left and right brake pedals 40 at the depression release positions, and when the detection values of the left and right brake sensors 26 indicate the depression release positions of the left and right brake pedals 40 while the coupling switch is turned on, the steering control unit 22C can detect the released state of the left and right brakes 42. When the left and right brake switches 25 do not detect the left and right brake pedals 40 at the depression release positions, and when the detection values of the left and right brake sensors 26 indicate the maximum depression positions of the left and right brake pedals 40 while the coupling switch is turned on, the steering control unit 22C can detect the braking state of the left and right brakes 42. In other words, the left and right brake switches 25 and the left and right brake sensors 26 function as a second operation sensor that detects the operation of the left and right brakes 42 when the left and right brake pedals 40 are coupled by the coupling mechanism 55.

The steering control unit 22C having the above-described configuration controls the operation of the electric motor 102 on the basis of the detection of the left and right brake switches 25, the detection values of the left and right brake sensors 26, the detection of the release switch 113, and the detection of the braking switch 114, while the left and right brake pedals 40 are coupled by the coupling mechanism 55. Through such control, the steering control unit 22C can certainly switch the left and right brakes 42 from a released state to a braking state, and from a braking state to a released state.

As illustrated in FIGS. 8 to 12, the second brake operating device 100 includes a housing case 116 that is fixed to a floor plate (an example of a fixing portion of the vehicle) 38 of the driver unit 12. The housing case 116 has a base plate 117, a left case body 118, a first support plate 119, a second support plate 120, and a right case body 121. The base plate 117 is detachably bolted to the floor plate 38. The left case body 118 is bolted to the floor plate 38 and the base plate 117. The first support plate 119 is welded to the inner face of the left case body 118. The second support plate 120 is fixed to the sidewall of the left case body 118 with a predetermined gap provided therebetween. The right case body 121 is bolted to the left case body 118. In the housing case 116, a storage space is formed between the left case body 118 and the right case body 121.

In the housing case 116, three stepped bolts 122 extending from the sidewall of the left case body 118 in the right direction are fixed to the left case body 118. The second support plate 120 is fixed to the sidewall of the left case body 118 via the stepped bolts 122. Among the three stepped bolts 122, the stepped bolt 122 positioned near the center of the sidewall is used as a support shaft 123 to rotatably support the output gear 110. A guide hole 118a for guiding the linking pin 112 between the release position and the braking position is formed in the sidewall of the left case body 118 in an arc shape centered about the support shaft 123. The electric motor 102 is fixed to the first support plate 119 with three bolts 124. The input gear 109 that meshes with the output gear 110 is fixed to the output shaft of the worm reducer 102A of the electric motor 102. One end portion of the second support plate 120 functions as a first receiving portion 120A for receiving the linking pin 112 having reached the release position. The other end portion of the second support plate 120 functions a second receiving portion 120B for receiving the linking pin 112 having reached the braking position. The release switch 113 is fixed to the one end portion of the second support plate 120, and the braking switch 114 is fixed to the other end portion of the second support plate 120.

In the second brake operating device 100 having the above-described configuration, the electric motor 102, the deceleration gear set 111, the release switch 113, the braking switch 114, etc., are housed in the housing case 116. In this way, the housing case 116, the electric motor 102, the deceleration gear set 111, the release switch 113, the braking switch 114, etc., can be detachably attached to the floor plate 38 in an integrated state as a drive unit. After the driver unit has been attached, the operated body 101 coupled to the right brake pedal 40 and the output gear 110 of the drive unit are linked via the allowance portion 103 and the linking pin 112 so that the operated body 101 can be operated by the electric motor 102. In this way, the second brake operating device 100 can be installed to the driver unit 12 so that the left and right brakes 42 can be operated by the second brake operating device 100.

In other words, the second brake operating device 100 can be readily installed to the driver unit 12 without significantly modifying the configuration of the driver unit 12. In this way, the second brake operating device 100 can be retrofitted to the tractor 1. As a result, the second brake operating device 100 can be readily installed to the tractor 1. Also, maintenance, such as replacement of the second brake operating device 100, can be readily performed when a problem occurs in the second brake operating device 100.

Figure 8:
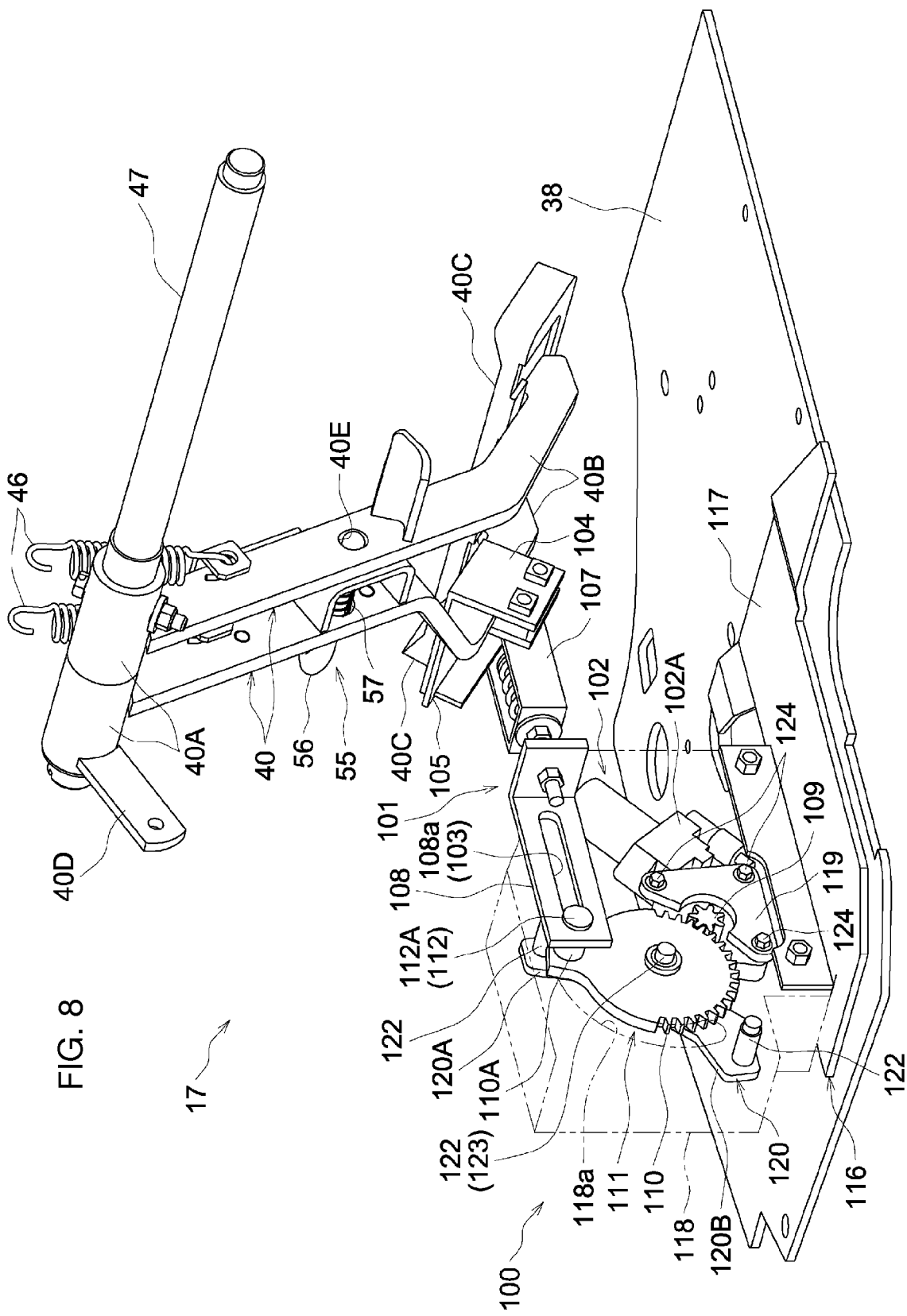
FIG. 8 is a perspective view from the upper right front side of a main portion of a brake system illustrating the brake operation structure by an electric motor.
Figure 9:
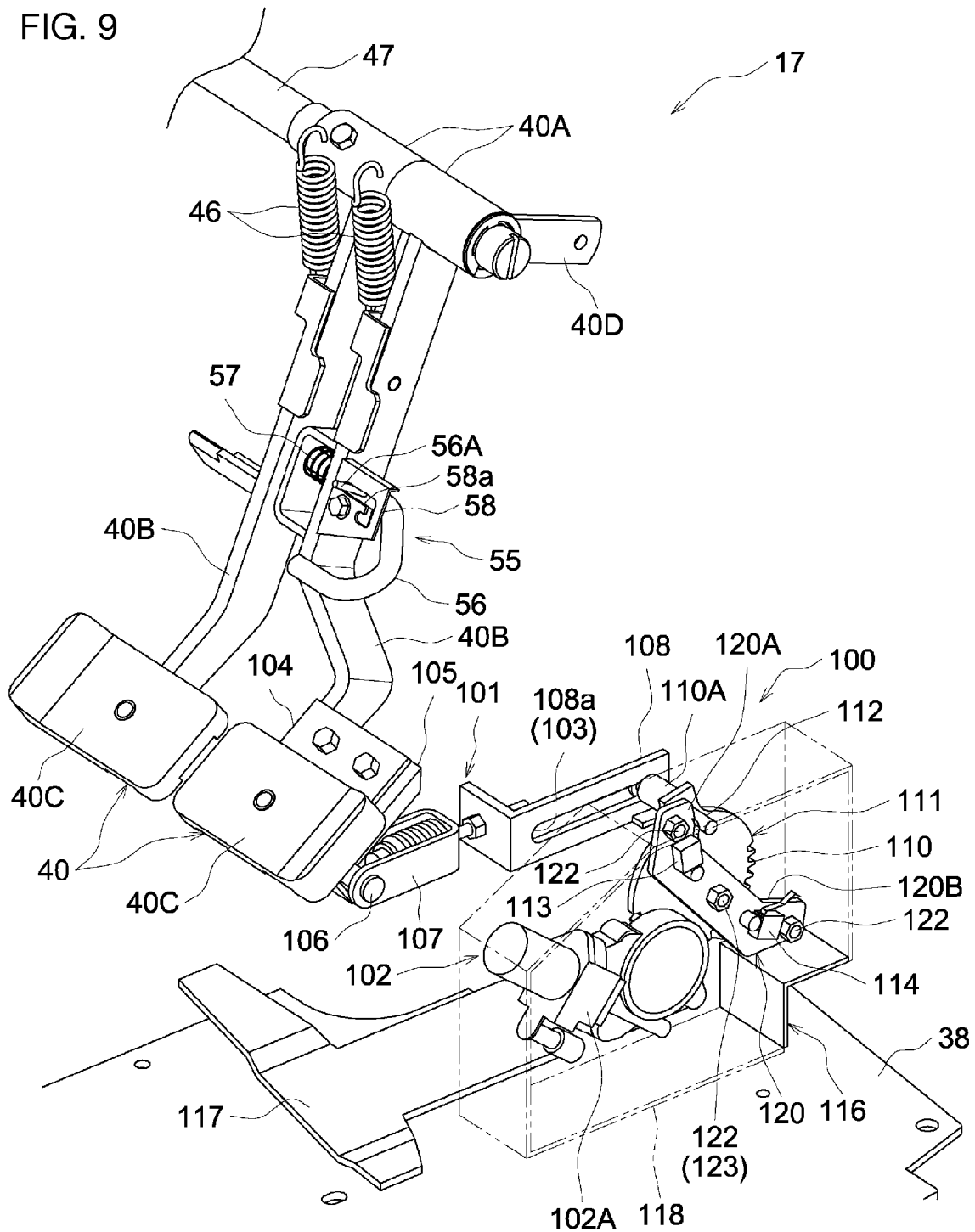
FIG. 9 is a perspective view from the upper right rear side of a main portion of a brake system illustrating the brake operation structure by an electric motor.
Figure 10:
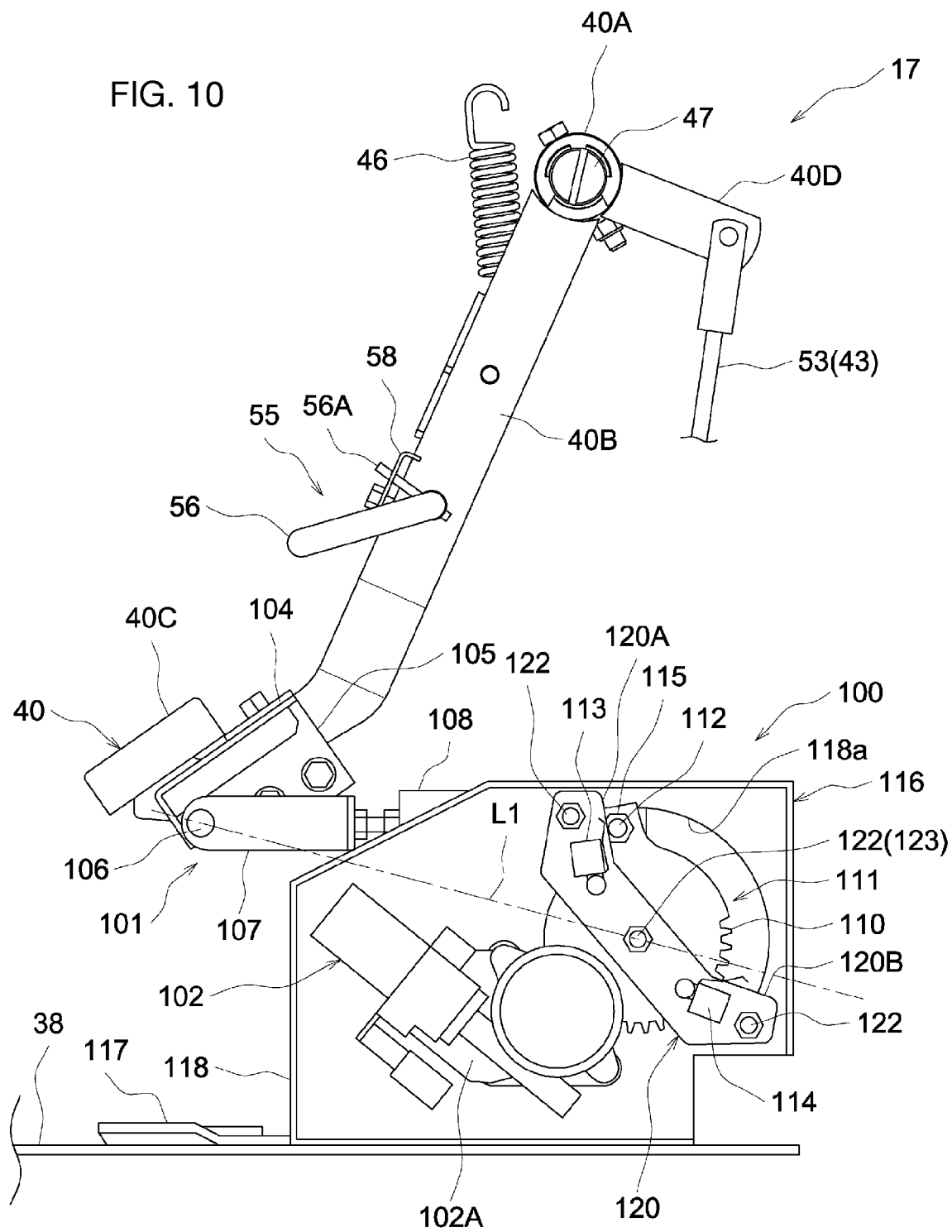
FIG. 10 is a right side view of a main portion of a brake system illustrating the brake operation structure by an electric motor.
Figure 11:
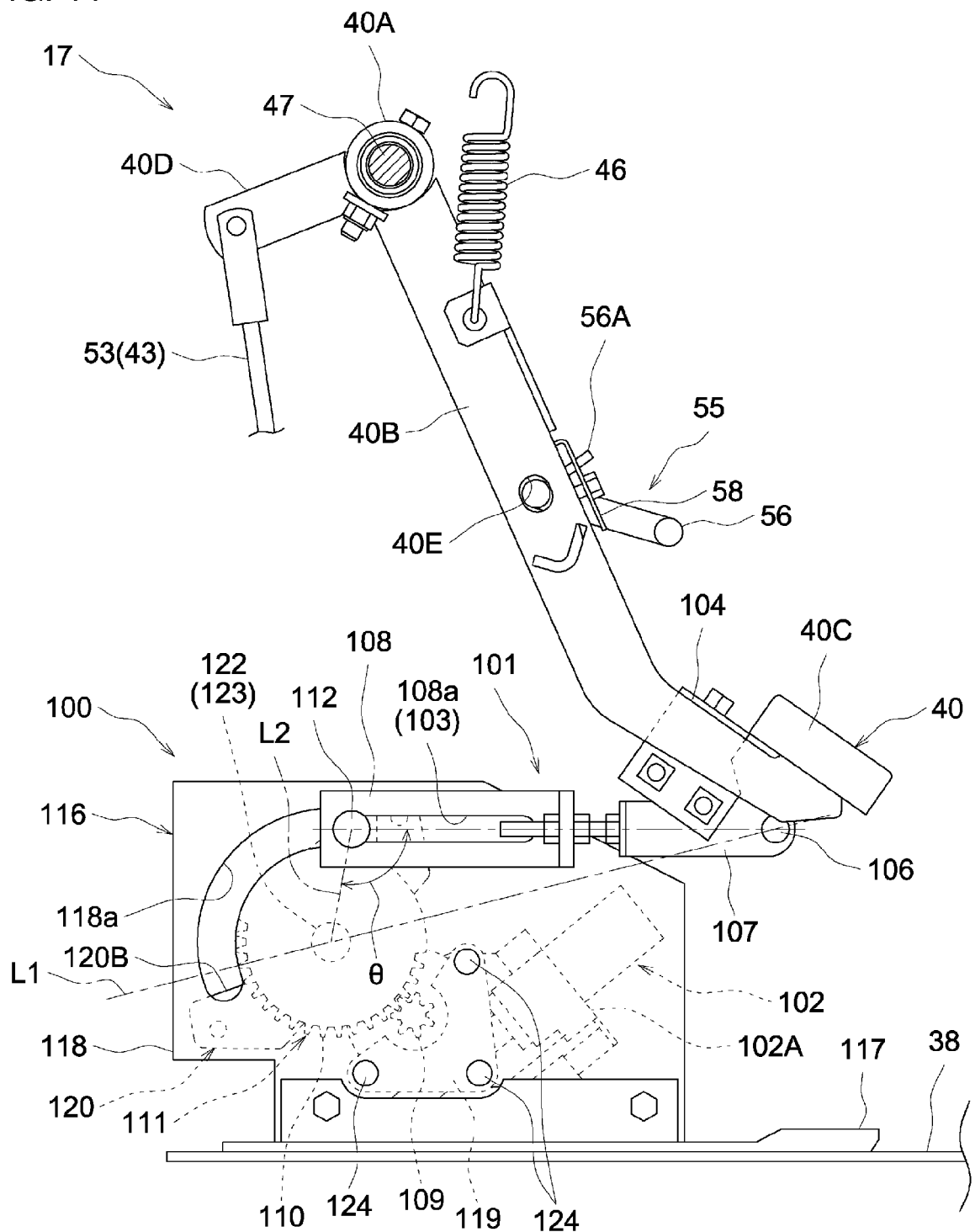
FIG. 11 is a longitudinal left side cross-sectional view of a main portion of a brake system illustrating foot brakes in a state not operated by an electric motor.
Figure 12:
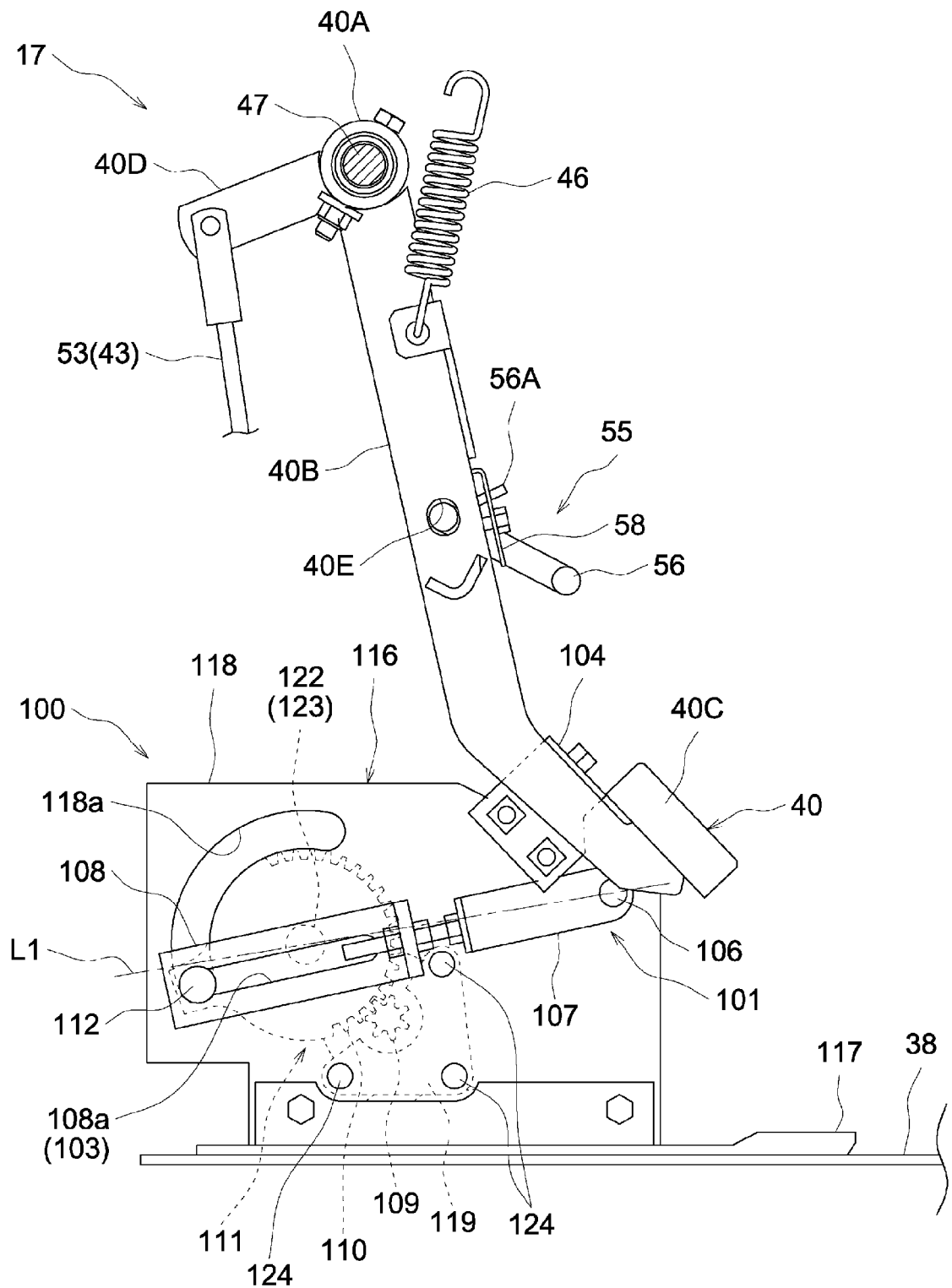
FIG. 12 is a longitudinal left side cross-sectional view of a main portion of a brake system illustrating foot brakes in a state operated by an electric motor.

As illustrated in FIGS. 8 to 10, the first receiving portion 120A and the second receiving portion 120B of the second support plate 120 function as a movement restrictor that restrict the movable range of the linking pin 112 between the release position and the braking position. The movable range of the linking pin 112 is set to a range in which the linking pin 112 moves between the release position and the braking position across an imaginary straight line L1. The imaginary straight line L1 passes through the coupling pin 106 and the support shaft 123. The coupling pin 106 is the coupling point of the operated body 101 with respect to the right brake pedal 40. The support shaft 123 is the rotation center of the output gear 110.

Figure 13:
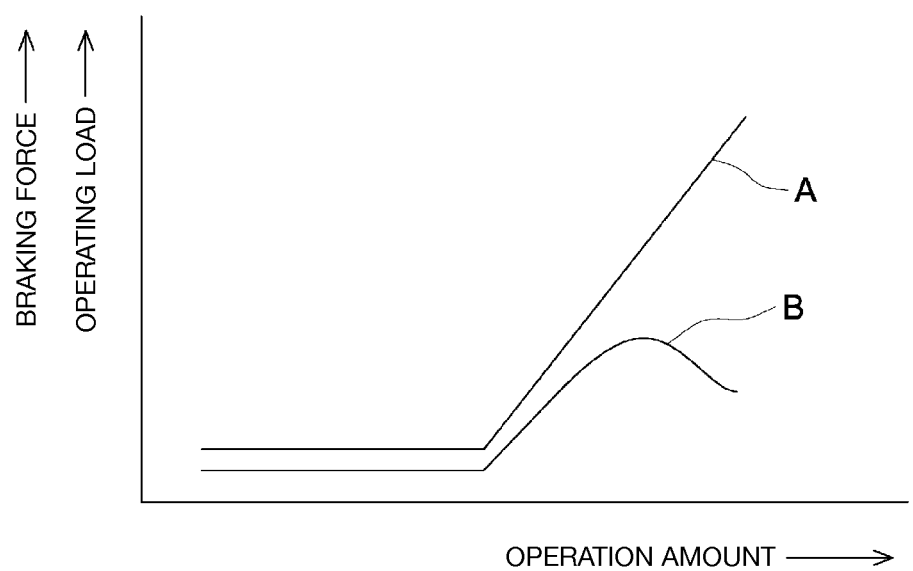
FIG. 13 is a graph illustrating the relation between the operation amount by the operation of an electric motor, a braking force, and an operating load.

With the above-described configuration, when the second brake operating device 100 operates the left and right brakes 42, the forward rotation power from the electric motor 102 is first transmitted to the output gear 110 to rotate the output gear 110 in the braking direction, and thereby, the linking pin 112 moves from the release position to the braking position while following an arc. At this time, a braking force A of the left and right brakes 42 increases in accordance with the amount of movement of the linking pin 112 passing through a play region including the release position and reaching the braking position, as illustrated in FIG. 13. An operating load B applied to the electric motor 102 increases as the linking pin 112 approaches the imaginary straight line L1 in a first movable range of the linking pin 112 after passing through the play region until crossing the imaginary straight line L1 because the reaction force from various parts, such as friction plates, generated inside the left and right brakes 42 increases with an increase in the braking force A of the left and right brakes 42, and the left and right brake pedals 40 are urged to return to the depression release position by the tension of the left and right extension springs 46. On the contrary, as the linking pin 112 approaches the imaginary straight line L1, the angle θ (see FIG. 11) between the line L2 connecting the linking pin 112 and the rotation center of the output gear 110 and the operated body 101 becomes smaller. As a result, the reaction force from the left and right brakes 42 and the tension from the left and right extension springs 46 applied to the left and right brake pedals 40 do not readily act as forces for returning the linking pin 112 to the release position. Thus, the amount of increase in operating load B applied to the electric motor 102 decreases. Thereafter, when the linking pin 112 crosses the imaginary straight line L1, the reaction force from the left and right brakes 42 and the tension of the left and right extension springs 46 shift to assisting the braking operation of the left and right brakes 42 by the electric motor 102. Therefore, the operating load B applied to the electric motor 102 decreases as the linking pin 112 moves away from the imaginary straight line L1 and approaches the braking position in a second movable range of the linking pin 112 after crossing the imaginary straight line L1 until reaching the braking position. With the linking pin 112 reached at the braking position, the linking pin 112 is urged to move in the braking direction by the reaction force from the left and right brakes 42 and the tension of the left and right extension springs 46 while the movement of the linking pin 112 in the braking direction is restricted by the second receiving portion 120B. In this way, for example, if the worm reducer 102A of the electric motor 102 is damaged or the output gear 110 is defective when the linking pin 112 reaches the second movable region after crossing the imaginary straight line L1, the linking pin 112 moves to and is held at the braking position by the reaction force from the left and right brakes 42 and the tension of the left and right extension springs 46. As a result, the left and right brakes 42 can be kept in a braking state, and the tractor 1 can be kept in a braking stop state.

As a result, as the operating load B applied to the electric motor 102 is reduced during the braking operation of the left and right brakes 42 by the second brake operating device 100, the tractor 1 can be kept at the braking stop state while the tractor 1 is braked and stopped by the operation of the second brake operating device 100, regardless of a damage to the worm reducer 102A of the electric motor 102 and a defect in the output gear 110.

As illustrated in FIG. 3, the safety brake function unit 22Fa monitors the operating state of the components of the tractor 1 and the communication state with the components on the basis of various items of detection information from the vehicle state detection device 23 received via the speed change control unit 22B, the steering control unit 22C, etc. In the autonomous drive mode, when the safety brake function unit 22Fa detects an error inside the vehicle on the basis of detection information from the vehicle state detection device 23 or obtains an emergency stop command from the mobile communication terminal 3 or an emergency stop remote control 90 (see FIG. 2), which is an example of a wireless communication device, the safety brake function unit 22Fa performs emergency stop control to control the operation of the electric motor 102 and switch the left and right brakes 42 from a released state to a braking state. For this reason, the tractor 1 includes an emergency stop communication antenna 91 for receiving an emergency stop command sent from the emergency stop remote control 90, as illustrated in FIG. 2.

An error inside the vehicle may include a drop in the engine speed to or below a set lower limit that may lead to engine stall, a control failure such as the vehicle speed of the tractor 1 deviating from the proper vehicle speed under the automatic speed change control by the speed change control unit 22B, and a communication failure in the CAN communication due to disconnection, etc.

Note that the error inside the vehicle may include a control failure such as a deviation of the current position of the tractor 1 measured by the positioning unit 24 from the target travel route under the automatic steering control by the steering control unit 22C.

Figure 14:
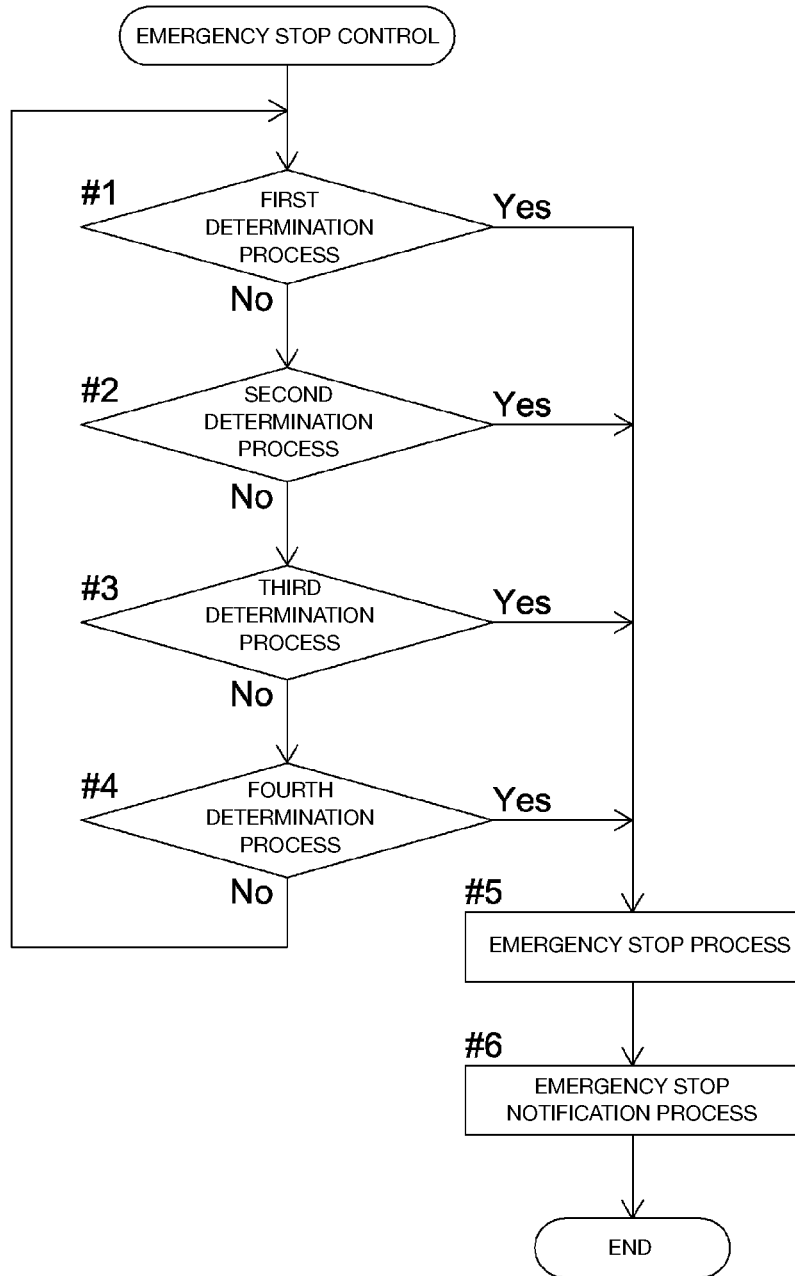
FIG. 14 is a flowchart of emergency stop control.

Therefore, under the emergency stop control, the safety brake function unit 22Fa performs a first determination process (step #1), a second determination process (step #2), a third determination step (step #3), and a fourth determination process (step #4), as illustrated in the flowchart in FIG. 14. In the first determination process (step #1), the safety brake function unit 22Fa determiners whether or not the engine speed has dropped to or below a set lower limit that may lead to engine stall on the basis of the detection information from a rotation sensor for engine speed detection included in the vehicle state detection device 23. In the second determination process (step #2), the safety brake function unit 22Fa determines whether or not a control failure, such as the vehicle speed of the tractor 1 deviating from the proper vehicle speed, has occurred in the speed change control unit 22B on the basis of the detection information from a vehicle sensor or the like included in the vehicle state detection device 23. In the third determination step (step #3), the safety brake function unit 22Fa determines whether or not a communication failure has occurred in the CAN communication on the basis of the detection information from an error detector for CAN communication included in the vehicle state detection device 23. In the fourth determination process (step #4), the safety brake function unit 22Fa determines whether or not an emergency stop command has been obtained from the mobile communication terminal 3 or the emergency stop remote control 90. When the engine speed decreases in the first determination process (step #1), when a control failure has occurred in the speed change control unit 22B in the second determination process (step #2), when a communication failure has occurred in the CAN communication in the third determination process (step #2), or when an emergency stop command is obtained in the fourth determination process (step #4), an emergency stop process (step #5) that causes an emergency stop of the tractor 1 and an emergency stop notification process (step #6) that provides a notification about the emergency stop are performed.

In the emergency stop process, the safety brake function unit 22Fa sends an engine stop command to the engine control unit 22A and sends a safety brake operation command for operating the left and right brakes 42 as safety brakes to the steering control unit 22C. In the emergency stop process, the safety brake function unit 22Fa deselects the autonomous drive mode and causes a transition of the drive mode from the autonomous drive mode to the manual drive mode. In the emergency stop notification process, the safety brake function unit 22Fa operates a notification device 83 (see FIG. 2), such as an indicator light for emergency stop, which is provided in the tractor 1 and sends an emergency stop notification command to the mobile communication terminal 3.

The engine control unit 22A performs the above-described automatic engine stop control in response to the engine stop command from the autonomous drive control unit 22F and automatically stops the engine 14.

The steering control unit 22C brakes and stops the tractor 1 by operating the electric motor 102 and switching the left and right brakes 42 from a released state to a braking state in response to the safety brake operation command from the safety brake function unit 22Fa.

The mobile communication terminal 3 performs the emergency stop notification process of switching the display screen of the display unit 4 to an emergency stop notification screen in response to the emergency stop notification command from the autonomous drive control unit 22F.

With this configuration, the left and right brake pedals 40 are coupled with the coupling mechanism 55 when the tractor 1 is autonomously driven, so as to automatically stop the engine 14, and automatically operate the left and right brakes 42 as safety brakes, thereby to brake and stop the tractor 1 in case an error occurs inside the vehicle, such as a decrease in the engine speed to or below a set lower limit, a control failure in the speed change control unit 22B, or a communication failure in the CAN communication.

As a result, in case any of the above-mentioned errors occurs inside the vehicle in the autonomous drive mode, the tractor 1 can be quickly braked and stopped and kept in the braking stop state, even when the tractor 1 is in an unmanned drive state in which the tractor 1 is autonomously driven. When the rotary tiller 6 is operating, the engine 14 can be stopped, and the operation of the rotary tiller 6 can also be stopped.

Unlike the electrohydraulically controlled first brake operating device 45, which operates the left and right brakes 42 by the oil from the hydraulic pump driven by the engine power, the electric motor 102 can operate the left and right brakes 42 and keep a braking state, even after the engine 14 has stopped and the hydraulic pressure has dropped. In this way, the tractor 1 can be kept in the braking stop state even after the engine control unit 22A has stopped the engine 14 in response to an engine stop command from the autonomous drive control unit 22F.

As a result, it is possible to avoid the risk of the tractor 1 unexpectedly descending from an emergency stop position of the tractor 1 located on a slope tilting in the travel direction of the tractor 1.

After the emergency stop process described above has been performed, the safety brake function unit 22Fa performs the emergency stop release process if the power is turned off by operating to turn off a key switch (an example of an operating tool) 84 (see FIG. 2) provided in the driver unit 12 and then turned on again by turning on the key switch 84. In the emergency stop release process, the safety brake function unit 22Fa sends an engine stop release command to the engine control unit 22A and sends a safety brake release command to the steering control unit 22C. The engine control unit 22A permits the activation of the engine 14 in response to the engine stop release command from the safety brake function unit 22Fa. The steering control unit 22C releases the braking stop of the tractor 1 by operating the electric motor 102 and switching the left and right brakes 42 from the braking state to a released state in response to the safety brake release command from the safety brake function unit 22Fa.

In this way, when the tractor 1 is urgently stopped under the control of the safety brake function unit 22Fa, the tractor 1 can be kept in the emergency stop state until the power that was turned off is turned on again by the operation of the key switch 84. When the power is turned on again by the operation of the key switch 84, the activation of the engine 14 is permitted, and the braking stop of the tractor 1 is released. In this way, the passenger can activate the engine 14, and the tractor 1 can be manually driven by the passenger. As a result, the tractor 1 can be moved to a safe place or a repair shop by manual driving.

Figure 15:
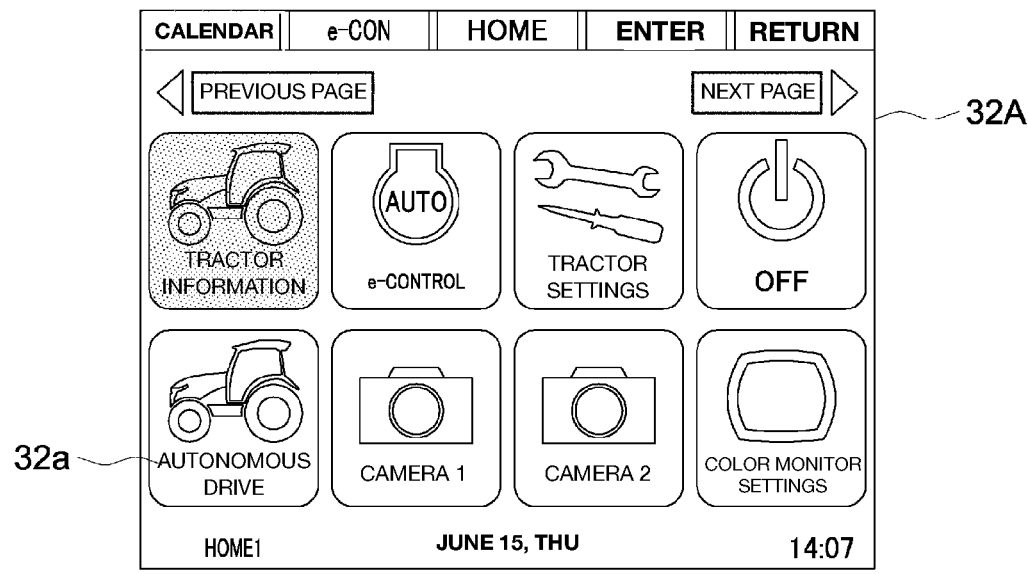
FIG. 15 is a diagram illustrating a home screen on a liquid crystal monitor.

As illustrated in FIG. 15, a home screen 32A of the liquid crystal monitor 32 displays a mode selection button (mode selector) 32a that enables selection of the autonomous drive mode and the like. When the autonomous drive mode is selected through operation of the mode selection button 32a, the autonomous drive control unit 22F performs a condition establishment determination process of determining whether or not all conditions for the transition of the drive mode of the tractor 1 from the manual drive mode to the autonomous drive mode are established. If all of the conditions are established, the autonomous drive control unit 22F causes the drive mode of the tractor 1 to transition from the manual drive mode to the autonomous drive mode, and notifies the mobile communication terminal 3 about the transition of the drive mode of the tractor 1 to the autonomous drive mode so as to enable the start of autonomous drive by operation of the mobile communication terminal 3. If all of the conditions are not established, the autonomous drive control unit 22F continues the condition establishment determination process until all of the conditions are established or the cancel button displayed on the liquid crystal monitor 32 is operated.

The conditions for the transition of the drive mode to the autonomous drive mode includes the completion of various setting operations required for the autonomous drive of the tractor 1, such as setting the engine speed for autonomous drive through an operation of the accelerator lever and setting the vehicle speed for autonomous drive through an operation of the speed change lever, as well as the confirmation of a normal operation during an initial check (operation confirmation process) for checking whether or not the left and right brakes 42 operate normally as safety brakes. In other words, in order to transition the driving mode to the autonomous drive mode, it is necessary to perform an initial check in advance and confirm that the left and right brakes 42 operate normally as the safety brakes.

An initial check is included in the control operation of the safety brake function unit 22Fa. When the normal operation has been confirmed through an initial check, the safety brake function unit 22Fa has caused a transition to an initial check completed state (operation checked state: "Check_OK" in FIG. 24). A valid period is set for the initial check completed state. In this embodiment, the valid period for the initial check completed state is set to within the same day. Therefore, the safety brake function unit 22Fa stores the transition date in the vehicle-mounted storage unit 22G at the time of the transition to the initial check completed state.

Note that the valid period for the initial check completed state may be set to various settings: for example, several days from the transition date, several hours from the transition time, or the time of driving a set distance from the distance at the transition.

The execution of an initial check is premised on the establishment of all of first to ninth conditions described below (conditions for starting the operation check process).

First condition: the steering control unit 22C controlling the operation of the electric motor 102 that causes the left and right brakes 42 to function as safety brakes is normal.

Second condition: the speed change control unit 22B that monitors the detection information from the left and right brake switches 25, the left and right brake sensors 26, etc., is normal.

Third condition: the CAN communication with the steering control unit 22C is normal.

Fourth condition: the CAN communication with the speed change control unit 22B is normal.

Fifth condition: the left and right brake pedals 40 are detected to be at the depression release positions on the basis of the detection information received from the left and right brake switches 25 and the left and right brake sensors 26 via the speed change control unit 22B.

Sixth condition: the reverser lever is detected to be in a neutral position on the basis of the detection information received from the reverser sensor via the speed change control unit 22B.

Seventh condition: the parking lever 41 is detected to not be at the braking position on the basis of the detection information received from the parking switch via the speed change control unit 22B.

Eighth condition: the left and right brake pedals 40 are detected to be coupled by the coupling mechanism 55 on the basis of the detection information received from the coupling switch via the steering control unit 22C.

Ninth condition: the vehicle speed is detected to be zero on the basis of the detection information received from the vehicle speed sensor via the speed change control unit 22B.

The state transitions of the safety brake function unit 22Fa during an initial check will be described below with reference to FIGS. 15 to 25.

The safety brake function unit 22Fa enters an initial state ("Start" in FIG. 24) when the power is turned on by turning on the key switch 84 (see FIG. 2). In the initial state, a period elapse determination process is performed to determine whether or not the initial check completed state has the valid period.

Figure 24:
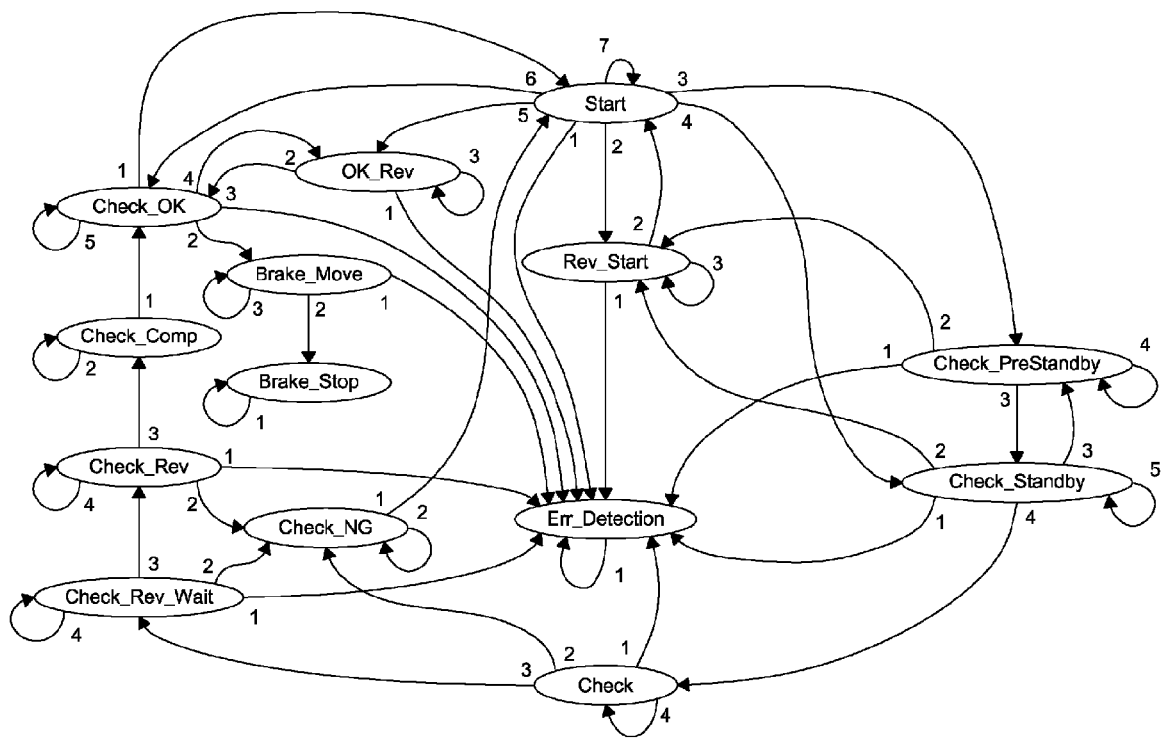
FIG. 24 is a state transition diagram illustrating state transition in an initial check of a safety brake function unit.

In the initial state, if the release switch 113 has detected the linking pin 112 operated by the electric motor 102 at the release position, and if the braking switch 114 has detected the linking pin 112 at the braking position, the safety brake function unit 22Fa determines that an error has occurred in any one of the electric motor 102, the release switch 113, and the braking switch 114 and causes a transition to an error detection state ("Err_Detection" in FIG. 24).

In the initial state, if the initial check completed state has continued for more than the valid period while the release switch 113 has not detected the linking pin 112 at the release position, the safety brake function unit 22Fa causes a transition to a brake release return operation state ("Rev_Start" in FIG. 24) and instructs the steering control unit 22C to release the left and right brakes 42 by the operation of the electric motor 102. In this way, the steering control unit 22C releases the left and right brakes 42 by the operation of the electric motor 102. If the safety brake function unit 22Fa has been operating the left and right brakes 42 as safety brakes while the key has been previously turned on, the left and right brakes 42 can be returned to a released state through the release operation.

If the autonomous drive mode is selected through the operation of the mode selection button 32a on the home screen 32A illustrated in FIG. 15 in the initial state, the safety brake function unit 22Fa performs a pre-condition determination process of determining whether or not the first to ninth conditions are all established.

Figure 16:
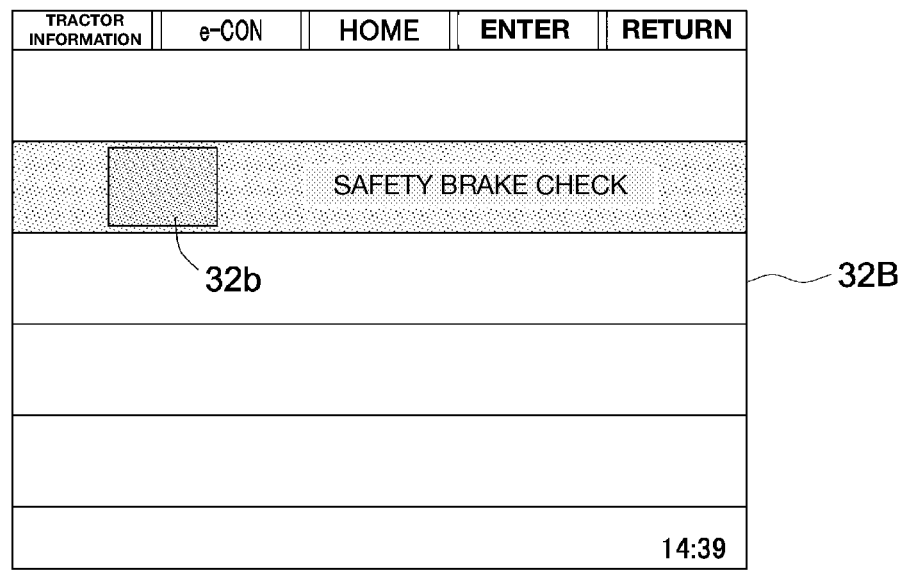
FIG. 16 is a diagram illustrating a safety-brake-check selection screen on a liquid crystal monitor.

If any one of the conditions 1 to 9 is not established in the pre-condition determination process, the safety brake function unit 22Fa causes a transition to a pre-condition establishment standby state ("Check_PreStandby" in FIG. 24) and causes a transition of the display screen of the liquid crystal monitor 32 to a safety brake check selection screen 32B illustrated in FIG. 16.

If all of the conditions 1 to 9 are established in the pre-condition determination process, the safety brake function unit 22Fa causes a transition to an initial check standby state ("Check_Standby" in FIG. 24) and causes a transition of the display screen of the liquid crystal monitor 32 to the safety brake check selection screen 32B illustrated in FIG. 16.

If the release switch 113 has not detected the linking pin 112 at the release position within the valid period of the initial check completed state, in the initial state, the safety brake function unit 22Fa causes a transition to a checked brake release return operation state ("OK_Rev" in FIG. 24) and instructs the steering control unit 22C to release the left and right brakes 42 by the operation of the electric motor 102. In this way, the steering control unit 22C releases the left and right brakes 42 by the operation of the electric motor 102. If the safety brake function unit 22Fa has been operating the left and right brakes 42 as safety brakes while the key has been previously turned on, the left and right brakes 42 can be returned to a released state through the release operation.

Figure 22:
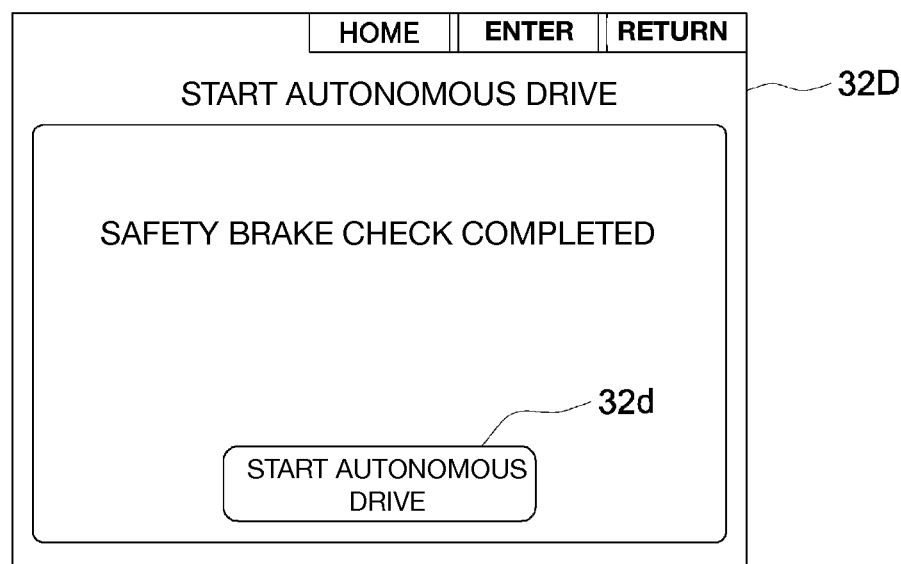
FIG. 22 is a diagram illustrating an autonomous drive start screen on a liquid crystal monitor.
Figure 23:
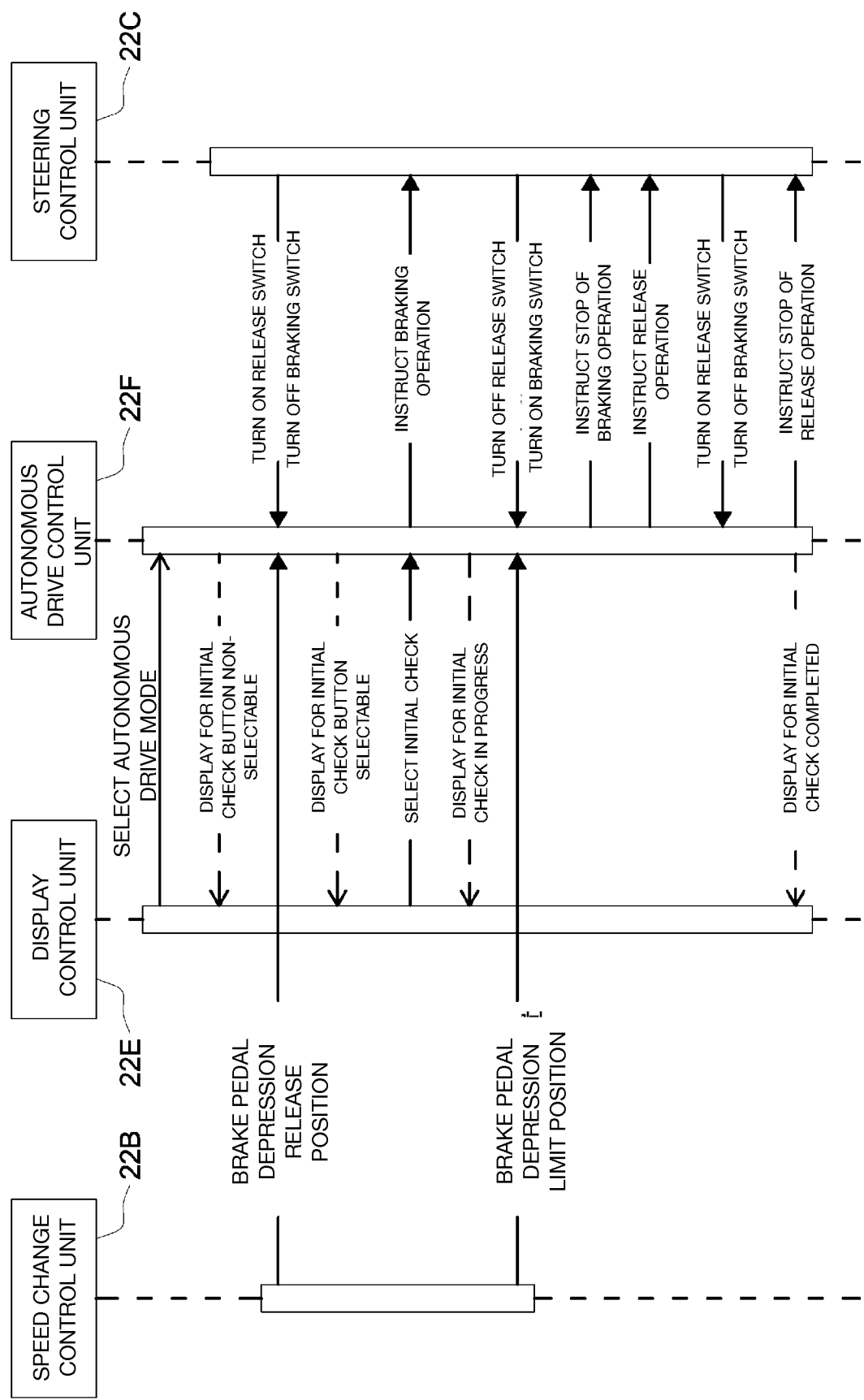
FIG. 23 is a diagram illustrating the sequence of an initial check (operation confirmation process).

In the period elapse determination process, if within the valid period of the initial check completed state and if the release switch 113 has detected the linking pin 112 at the release position, the safety brake function unit 22Fa causes a transition to the initial check completed state and causes a transition of the display screen of the liquid crystal monitor 32 to an autonomous drive start screen 32D illustrated in FIG. 22 to permit the transition of the drive mode from the manual drive mode to the autonomous drive mode.

Figure 17:
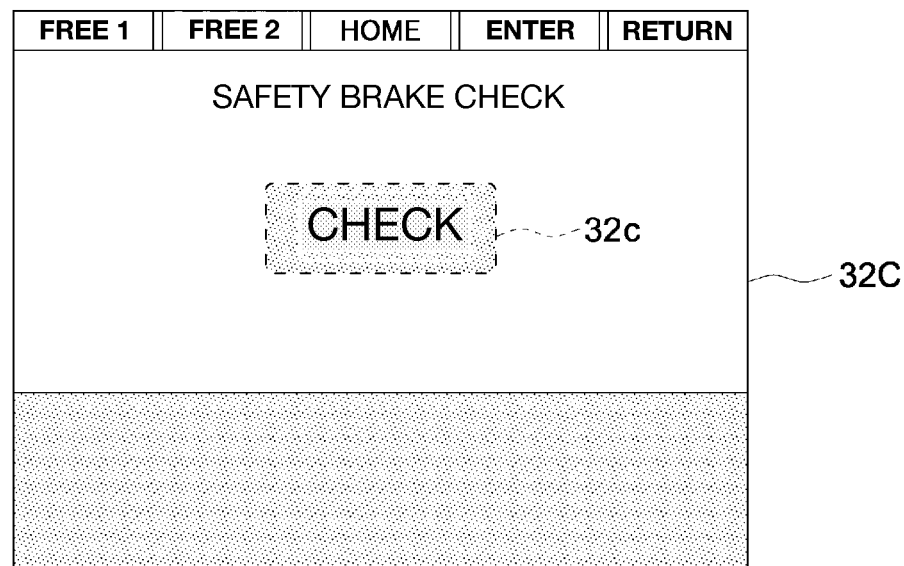
FIG. 17 is a diagram illustrating a safety brake check screen on a liquid crystal monitor in which an initial check button is displayed in an inoperable state.

If an initial check is selected through an operation of a check selection button 32b on the safety brake check selection screen 32B in the pre-condition establishment standby state, the safety brake function unit 22Fa causes the display screen of the liquid crystal monitor 32 to transition to a safety brake check screen 32C illustrated in FIG. 17. At this time, an initial check button 32c on the safety brake check screen 32C is grayed out, as illustrated in FIG. 17, to indicate that the initial check cannot be started through the operation of the initial check button 32c.

In the pre-condition establishment standby state, if the release switch 113 has detected the linking pin 112 at the release position, and if the braking switch 114 has detected the linking pin 112 at the braking position, the safety brake function unit 22Fa determines that an error has occurred in one of the electric motor 102, the release switch 113, and the braking switch 114 and causes a transition to the error detection state.

If the release switch 113 has not detected the linking pin 112 at the release position in the pre-condition establishment standby state, the safety brake function unit 22Fa causes a transition to the brake release return operation state, and instructs the steering control unit 22C to release the left and right brakes 42 by the operation of the electric motor 102.

Figure 18:
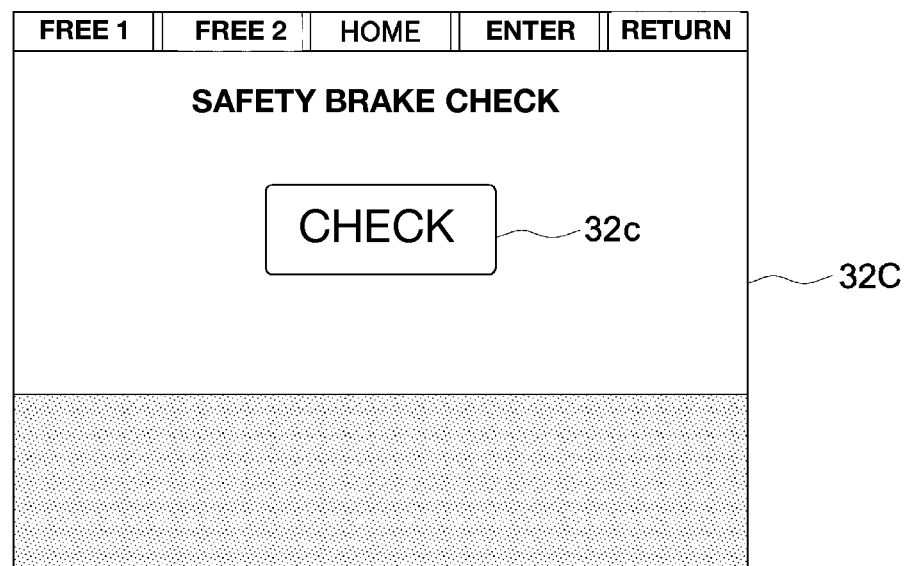
FIG. 18 is a diagram illustrating a safety brake check screen on a liquid crystal monitor in which an initial check button is displayed in an operable state.

In the pre-condition establishment standby state, if the release switch 113 has detected the linking pin 112 at the release position by the operation of the electric motor 102 and if the first to ninth conditions are all established while the braking switch 114 has not detected the linking pin 112 at the braking position by the operation of the electric motor 102, the safety brake function unit 22Fa causes a transition to the initial check standby state and causes the display state of the initial check button 32c on the safety brake check screen 32C to transition to a normal display state illustrated in FIG. 18, to indicate that the initial check can be selected through operation of the initial check button 32c.

In the pre-condition establishment standby state, if the release switch 113 has detected the linking pin 112 at the release position and none of the first to ninth conditions are established while the braking switch 114 has not detected the linking pin 112 at the braking position, the safety brake function unit 22Fa keeps the pre-condition establishment standby state and causes the display screen of the liquid crystal monitor 32 to transition to the safety brake check screen 32C illustrated in FIG. 17. At this time, an initial check button 32c is grayed out as illustrated in FIG. 17 on the safety brake check screen 32C, to indicate that the initial check cannot be selected by the operation of the initial check button 32c.

In the initial check standby state, if the release switch 113 has detected the linking pin 112 at the release position and the braking switch 114 has detected the linking pin 112 at the braking position, in the initial state, the safety brake function unit 22Fa determines that an error has occurred in any of the electric motor 102, the release switch 113, and the braking switch 114 and causes a transition to the error detection state.

If the release switch 113 has not detected the linking pin 112 at the release position in the initial check standby state, the safety brake function unit 22Fa causes a transition to the brake release return operation state and instructs the steering control unit 22C to release the left and right brakes 42 by the operation of the electric motor 102.

In the initial check standby state, if any of the first to ninth conditions is no longer established due to, for example, manual operation of the left and right brake pedals 40 or the reverser lever while the release switch 113 has detected the linking pin 112 at the release position, and the braking switch 114 has not detected the linking pin 112 at the braking position, the safety brake function unit 22Fa causes a transition to the pre-condition establishment standby state and causes the display state of the initial check button 32c on the safety brake check screen 32C to transition to a grayout state illustrated in FIG. 17, to indicate that the initial check cannot be selected through operation of the initial check button 32c.

Figure 19:
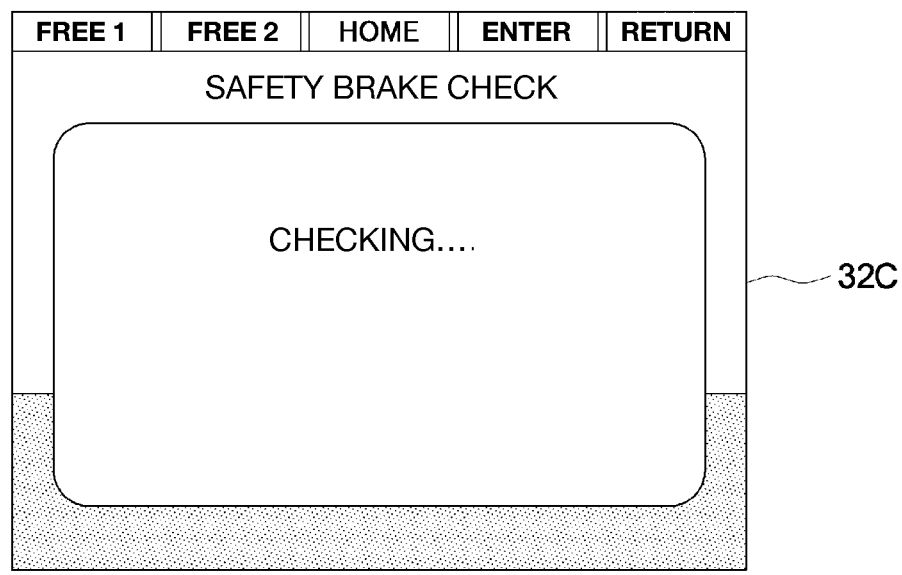
FIG. 19 is a diagram illustrating a safety brake check screen on a liquid crystal monitor indicating that a check is being performed.

If the initial check button 32c is operated in the initial check standby state, the safety brake function unit 22Fa causes a transition to a braking operation check state, ("Check" in FIG. 24) and causes the safety brake check screen 32C illustrated in FIG. 19 to indicate that an initial check is in progress.

The safety brake function unit 22Fa instructs the steering control unit 22C to brake the left and right brakes 42 by operating the electric motor 102 in the braking operation check state. In this way, the steering control unit 22C brakes the left and right brakes 42 by the operation of the electric motor 102.

In the braking operation check state, if the release switch 113 has detected the linking pin 112 at the release position and the braking switch 114 has detected the linking pin 112 at the braking position, or if the braking switch 114 does not detect the linking pin 112 at the braking position even after a predetermined braking operation check time, the safety brake function unit 22Fa determines that an error has occurred in any one of the electric motor 102, the release switch 113, and the braking switch 114, and causes a transition to the error detection state.

Figure 20:
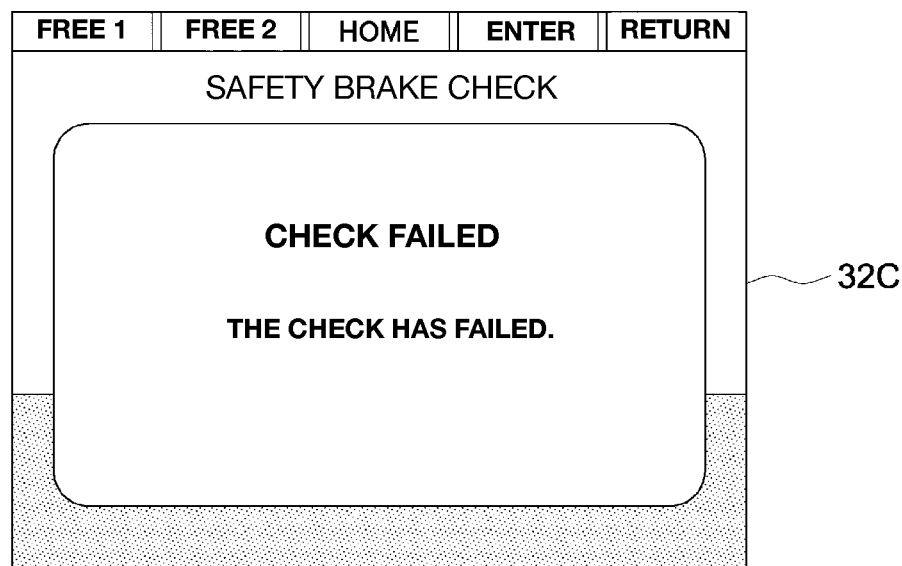
FIG. 20 is a diagram illustrating a safety brake check screen on a liquid crystal monitor indicating that a check has failed.

In the braking operation check state, if any one of the first to ninth conditions is no longer established due to, for example, manual operation of the left and right brake pedals 40 or the reverser lever, the safety brake function unit 22Fa causes a transition to an initial check failure state ("Check_NG" in FIG. 24) and displays on the safety brake check screen 32C that the initial check has failed, as illustrated in FIG. 20. When a predetermined display time elapses after the transition to the initial check failure state, the safety brake function unit 22Fa causes a transition to the initial state and causes the display screen of the liquid crystal monitor 32 to transition to the safety brake check selection screen 32B illustrated in FIG. 16. Then, if the check selection button 32b on the safety brake check selection screen 32B illustrated in FIG. 16 is operated, the safety brake function unit 22Fa causes a transition to the pre-condition establishment standby state and causes the display screen of the liquid crystal monitor 32 to transition to the safety brake check screen 32C illustrated in FIG. 17.

In the braking operation check state, if the release switch 113 no longer detects the linking pin 112 at the release position, and if the left and right brake switches 25 have detected a shift of the left and right brake pedals 40 from the depression release position after the braking switch 114 has detect the linking pin 112 at the braking position, and if the left and right brake sensors 26 have detected the left and right brake pedals 40 at the maximum depression positions, the safety brake function unit 22Fa determines that the left and right brake pedals 40 have been operated to the maximum depression positions, and the left and right brakes 42 have switched to a braking state. Then, on the basis of the determination, the safety brake function unit 22Fa causes a transition to a release operation check standby state ("Check_Rev_Wait" in FIG. 24), and instructs the steering control unit 22C to stop the braking operation of the left and right brakes 42 by the operation of the electric motor 102. In this way, the steering control unit 22C ends the braking operation of the left and right brakes 42 by the operation of the electric motor 102.

In the release operation check standby state, if the release switch 113 has detected the linking pin 112 at the release position, or the braking switch 114 has not detected the linking pin 112 at the braking position, the safety brake function unit 22Fa determines that an error has occurred in any one of the electric motor 102, the release switch 113, and the braking switch 114, and causes a transition to the error detection state.

If any one of the first to ninth conditions is no longer established, for example, as a result of manual operation of the left and right brake pedals 40 or the reverser lever, in the release operation check standby state, the safety brake function unit 22Fa causes a transition to the initial check failure state and displays on the safety brake check screen 32C that the initial check has failed, as illustrated in FIG. 20. When a predetermined display time elapses after the transition to the initial check failure state, the safety brake function unit 22Fa causes a transition to the initial state and causes the display screen of the liquid crystal monitor 32 to transition to the safety brake check selection screen 32B illustrated in FIG. 16. Then, if the check selection button 32b on the safety brake check selection screen 32B illustrated in FIG. 16 is operated, the safety brake function unit 22Fa causes a transition to the pre-condition establishment standby state and causes the display screen of the liquid crystal monitor 32 to transition to the safety brake check screen 32C illustrated in FIG. 17.

In the release operation check standby state, if the release switch 113 no longer detects the linking pin 112 at the release position and the braking switch 114 has detected the linking pin 112 at the braking position, or if the left and right brake switches 25 have detected a shift of the left and right brake pedals 40 from the depression release position and a predetermined standby time has elapses after the left and right brake sensors 26 have detected the left and right brake pedals 40 at the maximum depression positions, the safety brake function unit 22Fa causes a transition to a release operation check state ("Check_Rev in FIG. 24).

The safety brake function unit 22Fa instructs the steering control unit 22C to release the left and right brakes 42 by operating the electric motor 102 in the release operation check state. In this way, the steering control unit 22C releases the left and right brakes 42 by the operation of the electric motor 102.

In the release operation check state, if the release switch 113 has detected the linking pin 112 at the release position and the braking switch 114 has detected the linking pin 112 at the braking position, or if the release switch 113 has not detected the linking pin 112 at the release position even after a predetermined release operation check time, the safety brake function unit 22Fa determines that an error has occurred in any one of the electric motor 102, the release switch 113, and the braking switch 114, and causes a transition to the error detection state.

In the release operation check state, if any of the first to ninth conditions is no longer established, for example, due to manual operation of the left and right brake pedals 40 or the reverser lever, the safety brake function unit 22Fa causes a transition to the initial check failure state and displays on the safety brake check screen 32C that the initial check has failed, as illustrated in FIG. 20. When a predetermined display time elapses after the transition to the initial check failure state, the safety brake function unit 22Fa causes a transition from the initial check failure state to the initial state and causes the display screen of the liquid crystal monitor 32 to transition to the safety brake check selection screen 32B illustrated in FIG. 16. Then, if the check selection button 32b on the safety brake check selection screen 32B illustrated in FIG. 16 is operated, the safety brake function unit 22Fa causes a transition to the pre-condition establishment standby state and causes the display screen of the liquid crystal monitor 32 to transition to the safety brake check screen 32C illustrated in FIG. 17.

Figure 21:
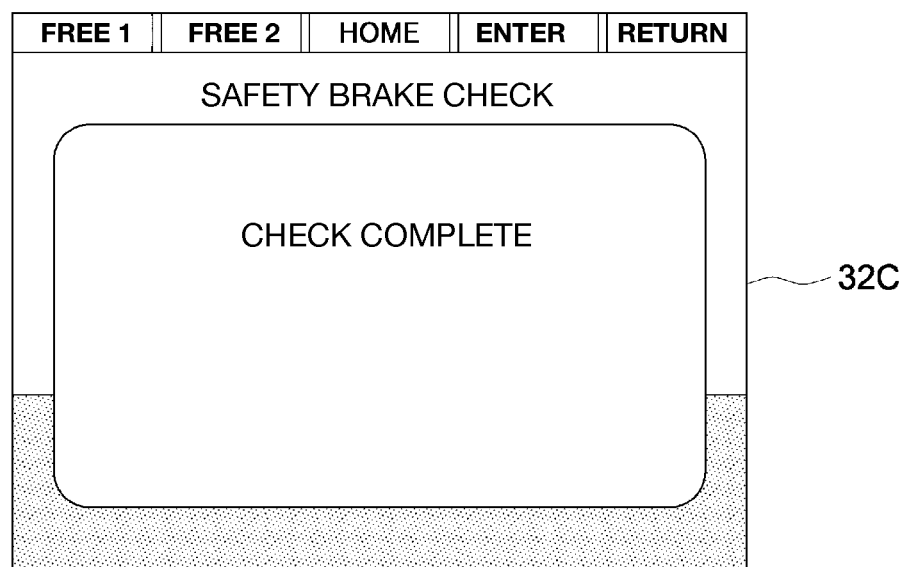
FIG. 21 is a diagram illustrating a safety brake check screen on a liquid crystal monitor indicating that a check has been completed.

In the release operation check state, if the release switch 113 has detected the linking pin 112 at the release position, and the left and right brake switches 25 and the left and right brake sensors 26 have detected the left and right brake pedals 40 at the depression release position while the braking switch 114 has not detected the linking pin 112 at the braking position, the safety brake function unit 22Fa determines that the left and right brake pedals 40 have been operated to the depression release position, and the left and right brakes 42 have switched to the released state. Then, on the basis of the determination, the steering control unit 22C is instructed to stop the release operation of the left and right brakes 42 by the operation of the electric motor 102. In this way, the steering control unit 22C ends the braking operation of the left and right brakes 42 by the operation of the electric motor 102. The safety brake function unit 22Fa then causes a transition to an initial check successful state ("Check_Comp" in FIG. 24) and displays on the safety brake check screen 32C that the initial check has been completed, as illustrated in FIG. 21.

The safety brake function unit 22Fa keeps the display of the completion of the initial check on the safety brake check screen 32C for a predetermined time in the initial check successful state. When the predetermined time elapses, the safety brake function unit 22Fa causes a transition to an initial check completed state (operation confirmed state) ("Check_OK" in FIG. 24), causes the display screen of the liquid crystal monitor 32 to transition to the autonomous drive start screen 32D illustrated in FIG. 22, and permits the transition of the drive mode from the manual drive mode to the autonomous drive mode.

When various setting operations necessary for the autonomous drive of the tractor 1, such as the setting of the engine speed for autonomous drive through an operation of the accelerator bar and the setting of the vehicle speed for autonomous drive through an operation of the speed change lever, are performed after the safety brake function unit 22Fa has caused a transition to the initial check completed state, all conditions for the transition of the drive mode to the autonomous drive mode are established. In a state in which all conditions are established, if an autonomous drive start button 32d displayed on the autonomous drive start screen 32D illustrated in FIG. 22 is operated, the autonomous drive control unit 22F causes the drive mode of the tractor 1 to transition from the manual drive mode to the autonomous drive mode, notifies the mobile communication terminal 3 about the transition of the drive mode of the tractor 1 to the autonomous drive mode, and enables the autonomous drive to be started by an operation of the mobile communication terminal 3.

In other words, when the tractor 1 is autonomously driven after the drive mode has transitioned to the autonomous drive mode, the left and right brakes 42 are preliminarily confirmed to operate normally as safety brakes through confirmation of the operation in advance. In this way, in case any of the above-described errors occurs inside the vehicle in the autonomous drive mode, the left and right brakes 42 can be operated normally as safety brakes, and the tractor 1 can be certainly braked and stopped.

As it is apparent from the description above, the initial check (operation confirmation process) includes a first operation confirmation process and a second operation confirmation process. The first operation confirmation process confirms whether or not the electric motor 102 is operating normally on the basis of the detection information from the release switch (first operation sensor) 113 and the braking switch (first operation sensor) 114 that detect the operation of the electric motor 102. The second operation confirmation process confirms whether or not the left and right brakes 42 are operating normally on the basis of the detection information from the left and right brake switches (second operation sensor) 25 and the left and right brake sensors (second operation sensor) 26 that detect the operation of the left and right brakes 42.

In this way, the operation of the electric motor 102 that causes the left and right brakes 42 to operate as the safety brakes and the operation of the left and right brakes 42 functioning as safety brakes are confirmed separately in the initial check (operation confirmation process) for checking whether or not the left and right brakes 42 operate normally as safety brakes. As a result, the initial check can be performed with high accuracy, and the reliability of the initial check can be enhanced.

When an initial check is to be performed, the safety brake function unit 22Fa first performs the pre-condition determination process, and starts the initial check when all conditions for starting the initial check, which are necessary for starting the initial check, are established, as described above. In this way, it possible to avoid inconveniences, such as a decrease in the reliability of the initial check caused by a decrease in the load applied to the electric motor 102 during the initial check due to the left and right brake pedals 40 being depressed or the left and right brake pedals 40 being decoupled, or the incompletion of the initial check due to errors in the speed change control unit 22B, the CAN communication, etc.

As described above, the valid period is set for the initial check completed state. Therefore, the safety brake function unit 22Fa performs the period elapse determination process described above in the initial check completed state. If the valid period elapses in the period elapse determination process, the safety brake function unit 22Fa causes a transition from the initial check completed state to the initial state, as illustrated in FIG. 24.

At this time, if the drive mode is the autonomous drive mode, the safety brake function unit 22Fa causes the drive mode to transition from the autonomous drive mode to the manual drive mode, and prohibits a transition to the autonomous drive mode. The safety brake function unit 22Fa causes the display screen of the liquid crystal monitor 32 to transition to the safety brake check selection screen 32B illustrated in FIG. 16. If the check selection button 32b on the safety brake check selection screen 32B illustrated in FIG. 16 is operated, the safety brake function unit 22Fa performs the initial check with the above-described state transition, and causes the display screen of the liquid crystal monitor 32 to transition to the autonomous drive start screen 32D illustrated in FIG. 22 after a transition to the initial check completed state and permits the transition of the drive mode from the manual drive mode to the autonomous drive mode.

In this way, an initial check is performed regularly, for example, when the tractor 1 is autonomously driven for several days. For this reason, it is possible to effectively suppress the risk of the left and right brakes 42 not operating normally as safety brakes in case any of the errors described above or any other errors occur inside the vehicle.

Note that, when the valid period of the initial check completed state elapses in the period elapse determination process, and the drive mode is already set to the autonomous drive mode, the safety brake function unit 22Fa may enable the initial check completed state while the user keeps the autonomous drive mode, and disable the initial check completed state when the user ends the autonomous drive mode, to cause a transition from the initial check completed state to the initial state.

On the other hand, when the drive mode is the manual drive mode, the safety brake function unit 22Fa indicates that the valid period of the initial check completed state has elapsed, on the display screen of the liquid crystal monitor 32 or the like.

In this way, when the tractor 1 is manually driven by the passenger, it is possible to inform the passenger in advance that an initial check is required for the transition of the drive mode to the autonomous drive mode. It is also possible to prevent a decrease in work efficiency due to periodical initial checks being performed during manual drive in which the left and right brakes 42 are not operated as safety brakes.

If any of the errors described above occur inside the vehicle in the initial check completed state, the safety brake function unit 22Fa causes a transition to the safety brake operation state ("Brake_Move" in FIG. 24), and instructs the steering control unit 22C to brake the left and right brakes 42 by the operation the electric motor 102. In this way, the steering control unit 22C brakes the left and right brakes 42 by the operation of the electric motor 102.

In the initial check completed state, if the release switch 113 has detected the linking pin 112 at the release position, and the braking switch 114 has detected the linking pin 112 at the braking position, the safety brake function unit 22Fa determines that an error has occurred in one of the electric motor 102, the release switch 113, and the braking switch 114, and causes a transition to the error detection state.

In the initial check completed state, if within the valid period of the initial check completed state, and the release switch 113 has not detected the linking pin 112 at the release position while no error has occurred inside the vehicle, the safety brake function unit 22Fa causes a transition to the checked brake release return operation state ("OK_Rev" in FIG. 24), and instructs the steering control unit 22C to release the left and right brakes 42 by the operation of the electric motor 102. In this way, the steering control unit 22C releases the left and right brakes 42 by the operation of the electric motor 102.

In the checked brake release return operation state, if the release switch 113 has not detected the linking pin 112 at the release position even after a predetermined time for releasing the braking has elapsed, the safety brake function unit 22Fa determines that an error has occurred in any of the electric motor 102, the release switch 113, and the braking switch 114 and causes a transition to the error detection state.

In the checked brake release return operation state, if the release switch 113 has detected the linking pin 112 at the release position within the predetermined time for releasing the braking, the safety brake function unit 22Fa causes a transition to the initial check completed state ("Check_OK" in FIG. 24), causes the display screen of the liquid crystal monitor 32 to transition to the autonomous drive start screen 32D illustrated in FIG. 22, and permits a transition of the drive mode from the manual drive mode to the autonomous drive mode.

In the brake release return operation state ("Rev_Start" in FIG. 24), if the release switch 113 has detected the linking pin 112 at the release position and the braking switch 114 has detected the linking pin 112 at the braking position, or if the release switch 113 has not detected the linking pin 112 at the release position even after the predetermined time for releasing the braking has elapsed, the safety brake function unit 22Fa determines that an error has occurred in any one of the electric motor 102, the release switch 113, and the braking switch 114, and causes a transition to the error detection state.

In the brake release return operation state, if the release switch 113 has detected the linking pin 112 at the release position, and if the braking switch 114 has not detected the linking pin 112 at the braking position, the safety brake function unit 22Fa causes a transition to the initial state ("Start" in FIG. 24).

In the safety brake operation state ("Brake_Move" in FIG. 24), if the release switch 113 detects the linking pin 112 at the release position even after a predetermined time for brake operation has elapsed, or if the braking switch 114 has not detected the linking pin 112 at the braking position, the safety brake function unit 22Fa determines that an error has occurred in any one of the electric motor 102, the release switch 113, and the braking switch 114, and causes a transition to the error detection state.

In the safety brake operation state, if the release switch 113 no longer detect the linking pin 112 at the release position, and if the predetermined time for brake operation has elapsed while the braking switch 114 has detected the linking pin 112 at the braking position, the safety brake function unit 22Fa determines that the left and right brake pedals 40 have been operated to the maximum depression position and the left and right brakes 42 have switched to a braking state. Then, on the basis of the determination, the safety brake function unit 22Fa causes a transition to a safety brake operation hold state ("Brake_Stop" in FIG. 24), and instructs the steering control unit 22C to stop the braking operation of the left and right brakes 42 by the operation of the electric motor 102. In this way, the steering control unit 22C ends the braking operation of the left and right brakes 42 by the operation of the electric motor 102. As a result, the left and right brakes 42 can be held in an operated state as safety brakes, and the tractor 1 can be kept in the braking stop state.

Figure 25:
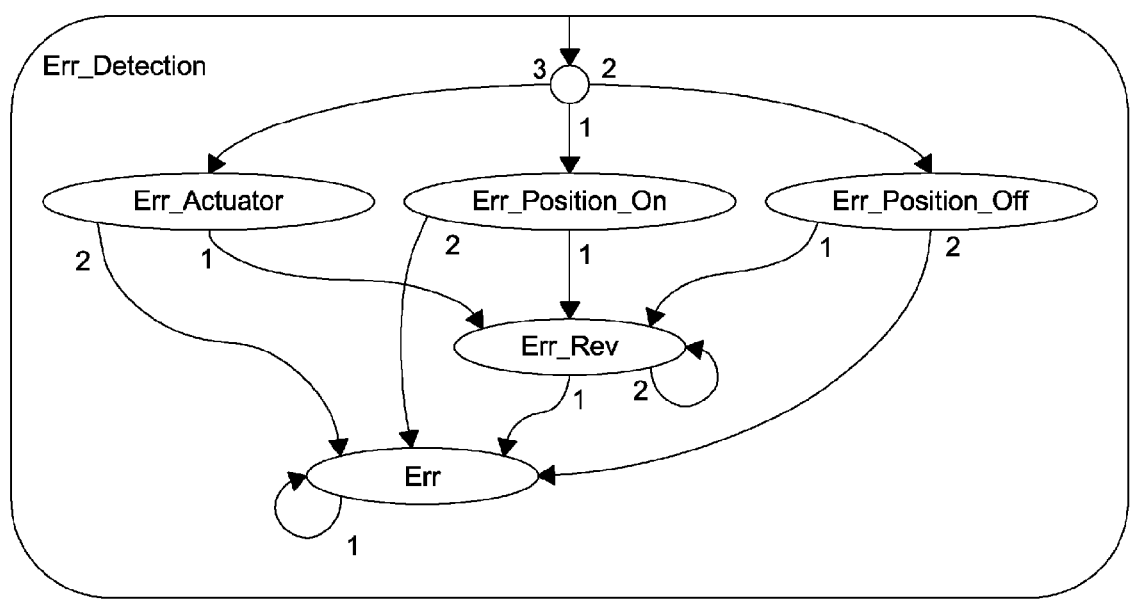
FIG. 25 is a state transition diagram illustrating state transition in an error detection state of a safety brake function unit.

As illustrated in FIG. 25, in the error detection state, the safety brake function unit 22Fa causes a transition to an electric motor error state ("Err_Actuator" in FIG. 25), an ON detection error state (Err_Position_ON in FIG. 25), or an OFF detection error state ("Err_Position_Off" in FIG. 25) in accordance with the detection states of the release switch 113 and the braking switch 114. In any of the error states, if the transition is not from the safety brake operation state, the state transitions to a brake released state for error ("Err-_Rev" in FIG. 25), and the steering control unit 22C is instructed to release the left and right brakes 42 by the operation of the electric motor 102. In this way, the steering control unit 22C releases the left and right brakes 42 by the operation of the electric motor 102. Then, the left and right brakes 42 can be returned to the released state by the release operation, and the tractor 1 can be manually driven by the passenger.

If a predetermined time for a release operation elapses in the brake released state for error, the safety brake function unit 22Fa causes a transition to an error state ("Err_Actuator" in FIG. 25) and keeps this state.

In any one of the electric motor error state, the ON detection error state, and the OFF detection error state, the safety brake function unit 22Fa causes a transition to the error state ("Err_Actuator" in FIG. 25) if the transition is from the safety brake operation state, and keeps this state. In this way, the left and right brakes 42 can be kept in an operated state as safety brake in the above-stated error state, and the tractor 1 can be kept in a braking stop state.

Other Embodiments

Other embodiments of the present invention will now be described.

The configurations of the respective embodiments described below are not necessarily applied independently, but may be applied under combination with the configurations of the other embodiments.

(1) Another typical embodiment regarding the configuration of the work vehicle is as follows.

For example, the work vehicle may be configured in a semi-crawler specification with left and right crawlers as driving devices 10 and 11 in place of the left and right front wheels 10 and the left and right rear wheels 11.

For example, the work vehicle may be configured in a full-crawler specification with left and right crawlers as driving devices 10 and 11 in place of the left and right front wheels 10 and the left and right rear wheels 11.

For example, the work vehicle may be configured in an electric specification with an electric motor in place of the engine 14.

For example, the work vehicle may be configured in a hybrid specification with the engine 14 and an electric motor.

For example, the work vehicle may be configured with a protective frame extending above tractor 1, in place of the cabin 13.

(2) Another typical embodiment regarding the configuration of the electric actuator 102 is as follows.

For example, the electric actuator 102 may be left and right electric motors 102 that individually operate the left and right brake pedals 40.

For example, the electric actuator 102 may be a single electric cylinder that operates the left and right brake pedals 40 coupled by the coupling mechanism 55.

For example, the electric actuator 102 may be left and right electric cylinders that individually operate the left and right brake pedals 40.

(3) The foot brake 42 may be a single one operated by a single brake pedal provided in the driver unit 12.

INDUSTRIAL APPLICABILITY

The present invention may be applied to a work vehicle, such as a tractor, a riding mower, a riding rice transplanter, a combine, a carrier, a wheel loader, or a snowplow.

DESCRIPTION OF REFERENCE NUMERALS 2 autonomous drive unit
10 driving device (front wheel)
11 driving device (rear wheel)
22Fa control unit (safety brake function unit)
32a mode selector (mode selection button)
42 foot brake (brake)
102 electric actuator (electric motor)
113 first operation sensor (release switch)
114 second operation sensor (braking switch)

The invention claimed is:

1. A work vehicle comprising:
a foot brake that brakes a driving device;
an autonomous drive unit that enables autonomous drive of a vehicle;
a mode selector that enables selection of an autonomous drive mode in which the autonomous drive unit autonomously drives the vehicle; and
an electric actuator that switches the foot brake between a braking state for braking the driving device and a released state for releasing the braking, wherein,
the autonomous drive unit includes a control unit that controls an operation of the electric actuator, and
when the autonomous drive mode is selected by a manual operation of the mode selector, the control unit performs an operation confirmation process for confirming whether or not the foot brake operates normally under operation control of the electric actuator, and when a normal operation of the foot brake is confirmed in the operation confirmation process, the control unit transitions to an operation confirmed state and permits a transition of a drive mode from a manual drive mode to the autonomous drive mode.

2. The work vehicle according to claim 1, further comprising:

a first operation sensor that detects an operation of the electric actuator; and a second operation sensor that detects an operation of the foot brake, wherein the operation confirmation process includes a first operation confirmation process for confirming whether the electric actuator is operating normally based on detection information from the first operation sensor, and a second operation confirmation process for confirming whether the foot brake is operating normally based on the detection information from the second operation sensor.

3. The work vehicle according to claim 1, wherein the control unit performs a pre-condition determination process for determining whether or not a condition for starting the operation confirmation process is established when the operation confirmation process is performed, and performs the operation confirmation process when the establishment of the condition for starting the operation confirmation process is confirmed in the pre-condition determination process.

4. The work vehicle according to claim 1, wherein, when the control unit transitions to the operation confirmed state, the control unit performs a valid period determination process for determining whether or not a valid period of the operation confirmed state has elapsed; when the valid period of the operation confirmed state has elapsed in the autonomous drive mode, the control unit transitions the drive mode from the autonomous drive mode to the manual drive mode and transitions from the operation confirmed state to an initial state; and when a normal operation of the foot brake is reconfirmed in the operation confirmation process, the control unit transitions to the operation confirmed state and permits a transition to the autonomous drive mode.

5. The work vehicle according to claim 1, wherein when the control unit transitions to the operation confirmed state, the control unit performs a valid period determination process for determining whether or not the valid period of the operation confirmed state has elapsed, and when the valid period of the operation confirmed state has elapsed in the manual drive mode, the control unit provides a notification on the elapse of the valid period.

* * * * *